United States Patent
Long et al.

(10) Patent No.: US 10,847,979 B2
(45) Date of Patent: Nov. 24, 2020

(54) CHARGING AND COMMUNICATION SYSTEM

(71) Applicant: ZHUHAI JIELI TECHNOLOGY CO., LTD, Guangdong (CN)

(72) Inventors: Shusheng Long, Guangdong (CN); Guangjun Luo, Guangdong (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 0 days.

(21) Appl. No.: 16/697,161

(22) Filed: Nov. 26, 2019

(65) Prior Publication Data

US 2020/0195030 A1    Jun. 18, 2020

(30) Foreign Application Priority Data

Dec. 14, 2018 (CN) .......................... 2018 1 1535109
Dec. 14, 2018 (CN) .......................... 2018 1 1535121

(51) Int. Cl.
*H02J 7/00* (2006.01)
*H02M 3/07* (2006.01)

(52) U.S. Cl.
CPC ................ *H02J 7/00* (2013.01); *H02M 3/07* (2013.01)

(58) Field of Classification Search
CPC .......... H04B 3/54; H04B 3/542; H04B 3/548; H04B 2203/547
See application file for complete search history.

(56) References Cited

U.S. PATENT DOCUMENTS

| | | | | |
|---|---|---|---|---|
| 5,686,813 A | * | 11/1997 | Huen | H01M 10/46 307/150 |
| 5,734,205 A | * | 3/1998 | Okamura | H02J 7/0024 307/110 |
| 2005/0170889 A1 | * | 8/2005 | Lum | A63F 13/235 463/39 |
| 2006/0033454 A1 | * | 2/2006 | Mathews | H05B 47/185 315/294 |
| 2008/0272993 A1 | * | 11/2008 | Le Roy | G09G 3/3283 345/84 |
| 2009/0180515 A1 | * | 7/2009 | Kiefer | G01D 21/00 374/185 |
| 2011/0260681 A1 | * | 10/2011 | Guccione | H02J 50/80 320/108 |
| 2011/0270462 A1 | * | 11/2011 | Amano | B60L 53/36 700/297 |
| 2012/0043923 A1 | * | 2/2012 | Ikriannikov | H02J 1/10 320/103 |

(Continued)

FOREIGN PATENT DOCUMENTS

CN       108767926 A       11/2018

*Primary Examiner* — Adam D Houston

(57) ABSTRACT

A charging and communication system includes a potential output terminal for supplying power to a to-be-charged device; a first controller for generating a first control signal; and a first potential switching module for switching a first potential and a second in response to the first control signal. At least one of the first potential and the second potential is a charging potential, so as to supply power to the to-be-charged device. The first potential and the second potential are not equal, so as to communicate information to the to-be-charged device. The complexity of the hardware circuit structure is reduced. The stability and reliability of the circuit structure is improved.

22 Claims, 14 Drawing Sheets

(56) References Cited

U.S. PATENT DOCUMENTS

| | | | | |
|---|---|---|---|---|
| 2012/0068618 | A1* | 3/2012 | Koski | G05B 11/01 315/240 |
| 2013/0100966 | A1* | 4/2013 | Huang | H04B 3/54 370/503 |
| 2014/0246993 | A1* | 9/2014 | Catalano | H05B 47/10 315/312 |
| 2014/0306657 | A1* | 10/2014 | Lundgren | H02J 50/80 320/108 |
| 2014/0312836 | A1* | 10/2014 | Lundgren | H02J 50/80 320/108 |
| 2015/0072180 | A1* | 3/2015 | Willemin | H01M 10/4257 429/7 |
| 2015/0255991 | A1* | 9/2015 | Tsunekawa | H02J 50/10 307/104 |
| 2015/0256028 | A1* | 9/2015 | Suman | H02J 9/065 307/23 |
| 2016/0206799 | A1* | 7/2016 | Lucke | A61N 1/3727 |
| 2016/0226298 | A1* | 8/2016 | Shimokawa | H04B 5/0081 |
| 2016/0233924 | A1* | 8/2016 | Puchianu | H04B 3/548 |
| 2016/0336783 | A1* | 11/2016 | Hsia | H02J 50/12 |
| 2016/0345627 | A1* | 12/2016 | Liu | G06K 19/0723 |
| 2016/0359355 | A1* | 12/2016 | Schoene | H02J 7/045 |
| 2017/0129347 | A1* | 5/2017 | Kotani | H02J 7/0027 |
| 2017/0133948 | A1* | 5/2017 | Kanou | H02J 13/00009 |
| 2017/0288434 | A1* | 10/2017 | Narita | H02J 7/02 |
| 2017/0317718 | A1* | 11/2017 | Yamamoto | H04L 5/143 |
| 2018/0034305 | A1* | 2/2018 | Lee | H02J 7/007192 |
| 2018/0152041 | A1* | 5/2018 | Onishi | H02J 7/025 |
| 2019/0007100 | A1* | 1/2019 | Yamashita | H04B 3/542 |
| 2019/0251054 | A1* | 8/2019 | Teutenberg | G06F 13/4022 |
| 2019/0305580 | A1* | 10/2019 | Lee | H02J 7/00034 |
| 2019/0356132 | A1* | 11/2019 | Fujimura | H02J 13/00 |
| 2020/0021121 | A1* | 1/2020 | Lee | H02J 7/0036 |
| 2020/0059264 | A1* | 2/2020 | Yamashita | H04L 29/02 |

\* cited by examiner

CHARGING AND COMMUNICATION SYSTEM

CROSS REFERENCE TO RELATED APPLICATIONS

The present application claims the benefit of Chinese Patent Application Nos. 201811535109.X and 201811535121.0 filed on Dec. 14, 2018. All the above are hereby incorporated by reference.

FIELD OF THE INVENTION

The present invention relates to the field of electronic technologies, and in particular, to a charging and communication system.

BACKGROUND OF THE INVENTION

With the development of science and technology, wireless earphones (such as wireless Bluetooth earphones) become increasingly popularized. Currently, a charging case is usually configured for a wireless earphone. In most cases, the wireless earphone is charged by the charging case by contacting two corresponding power source contacts. There are many communication demands between the charging case and the wireless earphone, including: detecting a battery level of the earphone after the wireless earphone is inserted into the charging case; powering on the wireless earphone after the earphone is removed from the charging case; pairing function on the charging case of the wireless earphone, and the like.

In a conventional solution, for a charging case and a wireless earphone that implement charging by contacting two power contacts, a no-load detection circuit in the charging case is used for detecting whether the output of the charging case is floating, that is, the charging case detects whether the wireless earphone is placed in the charging case. Upon detection that the output of the charging case is connected to a to-be-charged device, a charging current detection circuit in the charging case detects a value of a charging current of the charging case, and determines whether a battery in the earphone is fully charged. However, in the charging process of the wireless earphone, the current varies. Therefore, when information communication between the charging case and the wireless earphone is implemented by means of analog quantity detection, the method lacks variety and is not necessarily reliable. For example, the charging case determines, according to the charging current for the wireless earphone, whether the battery in the earphone is fully charged. If a battery charging module in the earphone carries out charging protection for the battery while the battery in the earphone is not fully charged yet, the charging current of the charging case for the earphone may become small. In this case, the charging case may make a mistake in determining the battery level of the earphone. Moreover, for some complex functions, such as pairing function on the charging case of the wireless earphone: there are two wireless twin wireless earphones in the charging case; when a user presses a button on the charging case, two wireless earphones are powered on, and are automatically connected to each other to form twin earphones; then, an external terminal can find the wireless earphones and perform pairing. Currently, the charging case and the wireless earphone that are connected merely through contacting two power contacts cannot implement the function reliably. However, adding contacts between the charging case and the wireless earphone obviously will increase the cost and unreliability.

In the prior art, to implement communication between the charging case and the wireless earphone in the charging process, a communication circuit and a switching circuit are usually added in the charging case and the wireless earphone respectively. Specifically, the communication circuit loads communication information by means of frequency modulation (for example, frequency mixing). The switching circuit is used for switching between a charging mode and a communication mode. That is, in the charging process, time division multiplexing of power contacts is implemented, so as to switch between the communication mode and the charging mode. However, when communication is carried out by means of frequency modulation, devices or functional modules such as a frequency mixer, a signal modulator, a signal demodulator, and a filter need to be added in a hardware aspect, and a series of operations such as frequency mixing, modulation, and demodulation are required in a signal processing aspect. It makes a circuit structure complex to add the foregoing hardware circuit in the charging case or wireless earphone. Moreover, adding excessive hardware circuits decreases the system reliability. In addition, the signal processing process is relatively complex.

Therefore, how to reduce the complexity of the hardware circuit structure to implement charging and communication becomes the first technical problem to be resolved urgently.

In addition, how to implement communication between a to-be-charged terminal out of battery or at a low battery level and a charging device becomes the second technical problem to be resolved urgently. Moreover, how to reduce the complexity of the hardware circuit structure to implement expression of communication information in the charging process becomes the third technical problem to be resolved urgently. Alternatively, how to implement providing or receiving power and transmitting or receiving communication information in parallel in the charging process without adding a signal receiving terminal becomes the fourth technical problem to be resolved urgently.

SUMMARY OF THE INVENTION

In view of the technical problems to be resolved in the prior art, the present invention provides a charging and communication system.

Therefore, according to a first aspect, an embodiment of the present invention discloses a charging and communication system.

The charging and communication system includes (1) a charging and communication circuit of a charging device, including: a potential output terminal, configured to provide power to a to-be-charged device after being connected to a power terminal of the to-be-charged device; a first potential switching module connected to the potential output terminal; and a first controller connected to the first potential switching module, the first controller being configured to generate a first control signal, where the first potential switching module switches between a first potential and a second potential in response to the first control signal, at least one of the first potential and the second potential is a charging potential, so as to provide power to the to-be-charged device, and the first potential is not equal to the second potential, so that information is transmitted to the to-be-charged device in the process of providing power to the to-be-charged device; and (2) a charging and communication circuit of the to-be-charged device, including a potential receiving terminal, the potential output terminal and the potential receiving terminal being detachable connected to transmit information.

In the charging and communication system according to an embodiment of the present invention, the potential output terminal is multiplexed. The first potential switching module switches between the first potential and the second potential in response to the first control signal, so that the potential of the potential output terminal switches between the first potential and the second potential. On one hand, at least one of the first potential and the second potential is the charging potential, so that the to-be-charged device can be charged through the potential output terminal. On the other hand, the first potential is not equal to the second potential. Therefore, in the process of charging the to-be-charged device, information can be transmitted to the to-be-charged device. That is, the first potential switching module switches between the first potential and the second potential to multiplex the potential output terminal, so that both charging and communication can be implemented in the charging process. Compared with the prior art, only the first potential switching module is added, which reduces the complexity of a hardware circuit structure. The circuit structure is simple and compact. Moreover, compared with the prior art, the charging and communication system according to an embodiment of the present invention has a simple structure, and few elements are added, so that the charging and communication system according to an embodiment of the present invention improves the stability and reliability of the circuit structure compared with the prior art.

According to a second aspect, an embodiment of the present invention discloses a charging and communication system.

The charging and communication system includes (1) a charging and communication circuit of a to-be-charged device, including: a potential receiving terminal, configured to receive power from a charging device after being connected to the charging device, the received power being configured as a signal set of first potentials and second potentials in at least a partial time period, and at least one of the first potential and the second potential being a charging potential, so as to supply power to a to-be-charged device; a second potential analysis module connected to the potential receiving terminal, the second potential analysis module being configured to analyze the signal set of the first potentials and the second potentials to obtain a digital signal sequence, and the first potential being not equal to the second potential, so that information transmitted by a charging device is obtained; and (2) a charging and communication circuit of the charging device, including a potential output terminal, the potential output terminal and the potential receiving terminal being detachably connected to transmit information.

In the charging and communication system disclosed in this embodiment of the present invention, the potential receiving terminal that receives power is multiplexed, and the received power is configured as the signal set of the first potentials and the second potentials in at least a partial period of time. On one hand, at least one of the first potential and the second potential is the charging potential. Therefore, the charging power can be provided to the to-be-charged device. On the other hand, the first potential is not equal to the second potential. Therefore, in the process of receiving power from the charging device, the second potential analysis module can analyze the signal set of the first potentials and the second potentials to obtain a digital signal sequence, thus obtaining information transmitted by the charging device. That is, by multiplexing the potential receiving terminal and by using the second potential analysis module, both reception of the power and transmission of communication can be implemented. Compared with the prior art in which, without addition of a signal receiving terminal, a single charging mode or a single communication mode needs to be performed in series, the solution of this invention can implement reception of power and communication information in parallel in the same period of time without adding a signal output terminal. Moreover, compared with the solution of charging and communication by means of multiple contacts, this invention reduces the complexity of a hardware circuit structure. The circuit structure is simple and compact. Compared with the prior art, this invention has a simple structure, and few elements are added, so that the charging and communication circuit according to this embodiment of the present invention improves the stability and reliability of the circuit structure compared with the prior art.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions of the present invention with reference to the accompanying drawings. Apparently, the described embodiments are merely some, rather than all, of the embodiments of the present invention. All other embodiments obtained by a person of ordinary skill in the art based on the teaching of the present invention without creative efforts shall fall within the scope of the present invention.

In the description of the present invention, it should be noted that, the terms "first," "second" and "third" are merely used for the purpose of description, and cannot be interpreted as indicating or implying relative importance.

In the description of the present invention, it should be noted that, unless otherwise specified and defined clearly, the terms "linkage" and "connection" should be interpreted in a broad sense. For example, a connection may be a fixed connection, a detachable connection, or an integrated connection; may be a mechanical connection or an electric connection; may be a direct connection, an indirect connection through an intermediary, or internal communication between two elements, and may be a wireless connection or a wired connection. A person skilled in the art may understand the specific meaning of the foregoing term in the present invention depending on a specific situation.

The present invention refers to a system and an arrangement for supplying power from a power provider side to a power receiving side, said provider side being connected to said receiver side through one or more terminals. The process of supplying power is also called charging process in this description.

In the description of the present invention, it should be noted that the term "charging device" means the device providing or supplying power to other devices; the term "to-be-charged device" means that the device to be charged which has no power or insufficient power, and when it is being charged, it becomes a "charged device". In this specification, for the sake of simplicity, the term "to-be-charged device" is used throughout the text.

In addition, technical features in different embodiments of the present invention described in the following may be combined as long as they do not cause conflict.

Figure 1:
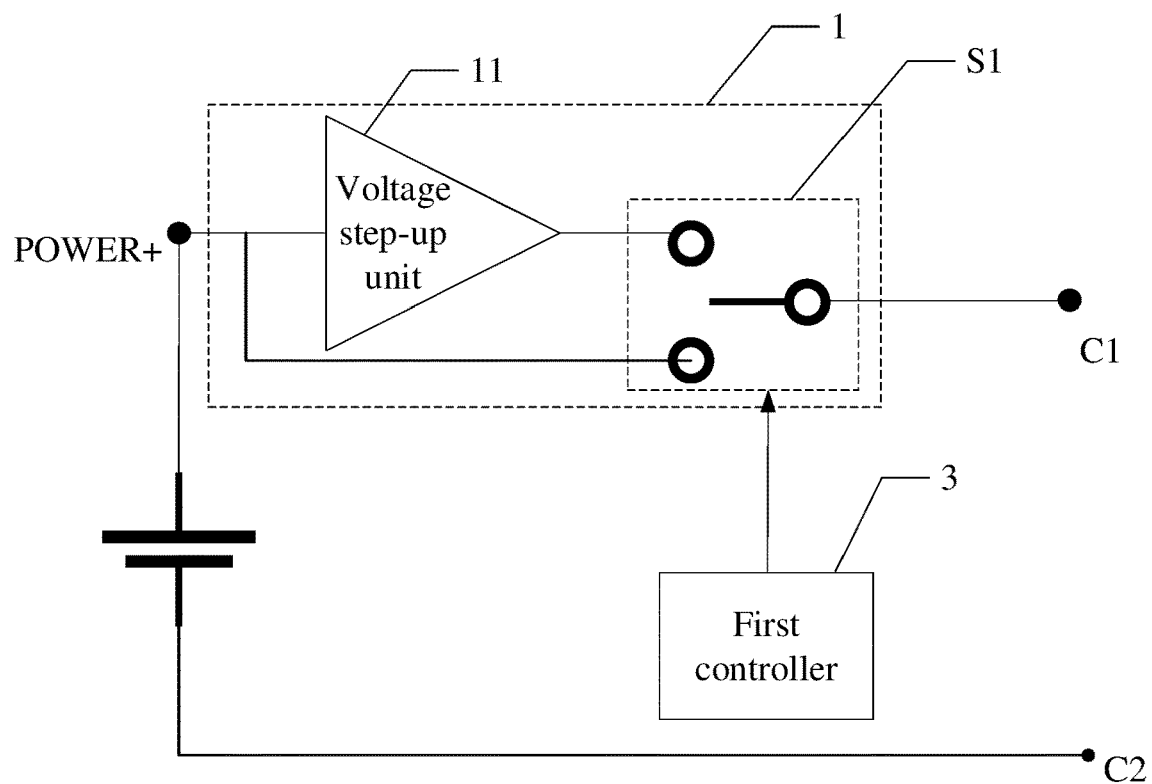
FIG. 1 is a schematic diagram of a charging and communication circuit used in a charging device according to an embodiment of this invention.

To implement communication in a charging process, an embodiment according to this invention discloses a charging and communication circuit applicable to a provider side of a charging power source (which is referred to as a charging device hereinafter). Refer to FIG. 1, which is a schematic diagram of a charging and communication circuit of a charging device according to an embodiment of this invention. A charging device usually includes a potential output terminal C1 and a ground terminal C2. After the potential output terminal C1 and the ground terminal C2 are connected to power terminals of a to-be-charged device respectively, the charging device can supply power to the to-be-charged device through the potential output terminal C1 and the ground terminal C2. The charging and communication circuit according to an embodiment includes: a first potential switching module 1 and a first controller 3, wherein the first potential switching module 1 includes a voltage step-up unit 11, an electronic switch S1.

An input of the voltage step-up unit 11 is configured to be connected to a charging power source POWER+, and the voltage step-up unit 11 is configured to increase a potential of the charging power source to a first potential. In this embodiment, the charging power source POWER+ may be a power source provided by a battery of the charging device, or may be an external power source received by the charging device, for example, through a power line. In a specific implementation process, the voltage step-up unit 11 may increase the potential of the charging power source POWER+ to the first potential after the input of the voltage step-up unit 11 receives the charging power source POWER+, and output the first potential. In this embodiment, the value of the first potential may be determined according to an actual requirement. This embodiment does not limit specific values of the first potential and the potential of the charging power source POWER+.

The electronic switch S1 includes a first input, a second input and an output. The switch S1 also includes a third control input (bottom). The switch S1 passes through the first input or the second input based on the value of the third control input. The first input of the electronic switch S1 is connected to the output of the voltage step-up unit 11. The second input of the electronic switch S1 is configured to be connected to the charging power source POWER+. The output of the electronic switch S1 is configured to be connected to the to-be-charged device. In a specific embodiment, the output of the electronic switch S1 may be connected to the to-be-charged device through the potential output terminal C1. It should be noted that, in a specific implementation process, because the potential of the output of the electronic switch S1 is equal to the potential of the potential output terminal C1, the two ends may also be regarded as the same end.

The first controller 3 is connected to the third input of the electronic switch S1. In an embodiment, the first controller 3 is configured to generate a first control signal. The first control signal is configured to represent a first communication information. In an embodiment, the first communication information refers to an communication information to be transmitted by the charging device, for example, "battery level query", "accessory pairing", "earphone alignment", and "battery level of the charging device". In a specific embodiment, the first controller 3 may encode the first communication information according to a preset encoding rule to form the first control signal. In an embodiment, the first control signal is a digital signal sequence. Specifically, the digital signal sequence may include, for example, any combination of an initial bit, a data bit, a check bit, a stop bit, or other bits in accordance with a communication protocol.

The electronic switch S1 switches between conduction with the first input and conduction with the second input in response to the received first control signal, so as to output the first potential or the second potential alternately. The first potential is an increased potential of the charging power source POWER+. The second potential is the potential of the charging power source POWER+. In this embodiment, the second potential is the potential of the charging power source POWER+ which can meet the potential required for operation of the to-be-charged device; the first potential is a potential of the charging power source POWER+ after boosting, therefore can also satisfy the potential required for operation of the to-be-charged device. Therefore, both the first potential and the second potential satisfy the potential required for the to-be-charged device, so that the power is provided to the to-be-charged device continuously regardless of which potential the switch S1 is switched to. In an embodiment, the first potential and the second potential are not equal, and they are constantly switched to indicate 0 or 1, so that information can be communicated to the to-be-charged device in the process of charging the to-be-charged device. This will be described in detail below.

In this embodiment, both the first potential and the second potential satisfy the potential required for operation of the to-be-charged device, so that the to-be-charged device can still perform a communication operation during charging even if the device is out of power or at a low battery level. In this embodiment, the second potential is provided by the charging power source POWER+ in the original circuit, without the need to set a second potential additionally. Existing resources of the circuit can be reused, thus reducing the complexity of the charging and communication circuit.

In the charging and communication circuit of a charging device according to this embodiment, the voltage step-up unit increases the potential of the charging power source to the first potential, and the electronic switch outputs the first potential or the second potential alternately in response to the first control signal that is generated by the first controller and used for representing the first communication information. The first potential and the second potential satisfy the potential required for operation of the to-be-charged device. Therefore, power can be supplied to the to-be-charged device continuously in the process of the electronic switch outputting the first potential or the second potential alternately. Moreover, because the first potential is not equal to the second potential, information can be communicated to the to-be-charged device in the process of supplying power to the to-be-charged device. That is, by means of switching between the first potential and the second potential, not only power is supplied to the to-be-charged device, but also information is communicated to the to-be-charged device in the process of charging. Moreover, in the solution disclosed in this embodiment of the present invention, based on the original circuit of the device, the communication information provided by the controller can be expressed by means of cooperation between the voltage step-up unit and the electronic switch, thus reducing the complexity of the hardware circuit structure. The circuit structure is simple and compact. Moreover, compared with the prior art, the charging and communication circuit according to this embodiment of the present invention has a simple structure, and few elements are added, so that the charging and communication circuit according to this embodiment of the present invention improves the stability and reliability of the circuit structure compared with the prior art.

Figure 2:
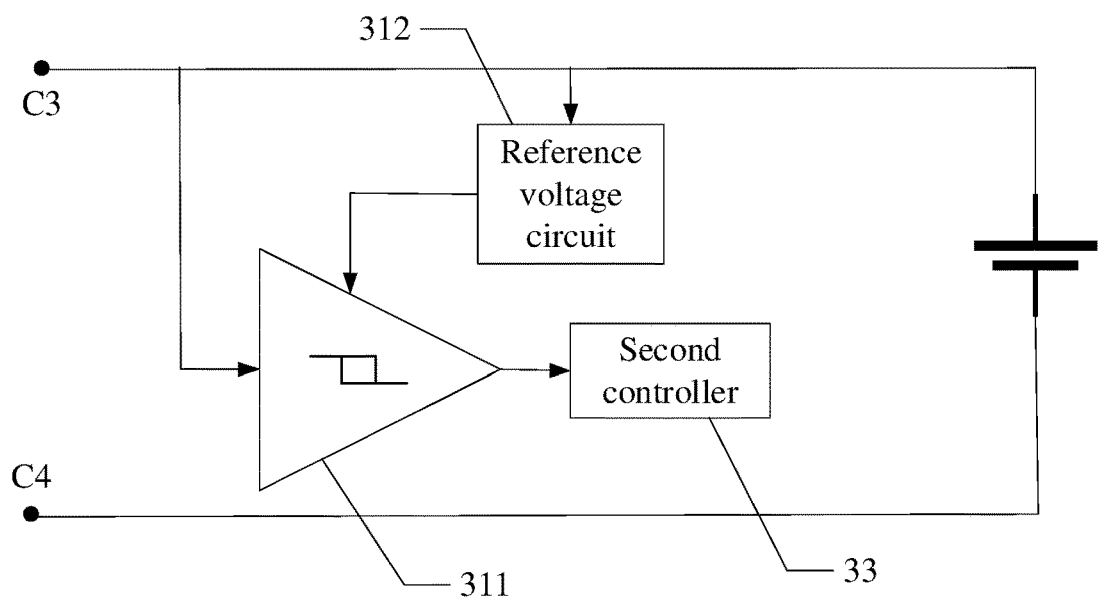
FIG. 2 is a schematic diagram of a charging and communication circuit used in a to-be-charged device according to an embodiment of this invention.

An embodiment according to this invention also discloses a charging and communication circuit applicable to a receiving side of a charging power source (which is referred to as a to-be-charged device hereinafter). In a specific embodiment, the to-be-charged device is a device used in coordination with the charging device in the foregoing embodiment, and may be, for example, an intelligent wearable device such as an earphone or a smart band, or may be an audio/video device such as an MP3 player or an MP4 player, or may be an intelligent accessory of an intelligent terminal which has data processing capability. Refer to FIG. 2, which is a schematic diagram of a charging and communication circuit of a to-be-charged device according to an embodiment. The to-be-charged device usually includes a potential receiving terminal C3 and a common ground terminal C4. After the potential receiving terminal C3 and the common ground terminal C4 are connected to power terminals (e.g. C1 and C2) of the charging device respectively, the to-be-charged device may receive, through the potential receiving terminal C3 and the common ground terminal C4, power provided by the charging device. The charging and communication circuit according to this embodiment includes: a second comparator 311, a reference voltage circuit 312, and a second controller 33.

An first input of the second comparator 311 is configured to be connected to the potential receiving terminal C3 of the to-be-charged device. A second input, that is a reference input, of the second comparator 311 is connected to the reference voltage circuit 312, and an output of the second comparator 311 is connected to the second controller 33.

The reference voltage circuit 312 is configured to provide a reference voltage to the reference input of the second comparator 311. Specifically, the reference voltage circuit 312 is connected to the reference input of the second comparator 311, and the reference voltage circuit 312 is configured to provide the reference voltage to the second comparator 311. In a specific embodiment, the reference voltage circuit 312 receives power from the potential receiving terminal C3. That is, the reference voltage circuit 312 is connected between the potential receiving terminal C3 and the reference voltage end of the second comparator 311. In an embodiment, the potential receiving terminal C3 supplies power to the reference voltage circuit 312, so that the power required for the reference voltage circuit 312 can be provided by the charging power of the charging device when a to-be-charged device is out of power or at a low battery level.

The input of the second comparator 311 is configured to receive a signal set of first potentials and second potentials from the potential receiving terminal C3. Both the first potential and the second potential can satisfy the power required for the to-be-charged device working in a communication process. In an embodiment, the second comparator 311 compares the signal set of the first potentials and the second potentials received by the first input thereof with the reference voltage to output a digital signal sequence. Specifically, because the first potential is not equal to the second potential, a reference potential is set between the first potential and the second potential. A high-level or a low-level digital signal may be outputted after the first potential or the second potential is compared with the reference potential. That is, the signal set of the first potentials and the second potentials representing the first communication information may be converted into a digital signal sequence. Such digital signal sequence may be read by a logic controlling element or a controller. Specifically, the second comparator 311 may be a common comparator in the existing technology, and is preferably a Schmitt trigger, so as to reduce glitches of output signal after comparison.

The second controller 33 is configured to obtain, according to the digital signal sequence, the information transmitted by the charging device. In a specific embodiment, the second controller 33 analyzes the digital signal sequence according to a decoding rule consistent with the preset encoding rule of the first controller, to obtain the information transmitted by the charging device end.

In the charging and communication circuit of a to-be-charged device according to an embodiment, the first input of the second comparator is configured to be connected to the potential receiving terminal of the to-be-charged device. The signal set of the first potentials and the second potentials from the potential receiving terminal is input to the second comparator, and the second comparator compare the received signal set with the reference voltage, and then output a digital signal sequence. The second controller may obtain, according to the digital signal sequence, the information transmitted by the charging device. That is, reception of the communication information is implemented. Both the first potential and the second potential can satisfy the power required for the to-be-charged device working in the communication process. Therefore, both charging and communication can be implemented by using the charging and communication circuit even if the to-be-charged device is out of power or at a low battery level. In the solution disclosed in this embodiment of the present invention, based on the original circuit of the device, the communication information transmitted by the charging device can be analyzed by using the comparator and the controller. The circuit structure is simple and compact. Moreover, compared with the prior art, the charging and communication circuit according to this embodiment of the present invention has a simple structure, and few elements are added, so that the charging and communication circuit according to this embodiment of the present invention improves the stability and reliability of the circuit structure compared with the prior art.

Figure 3:
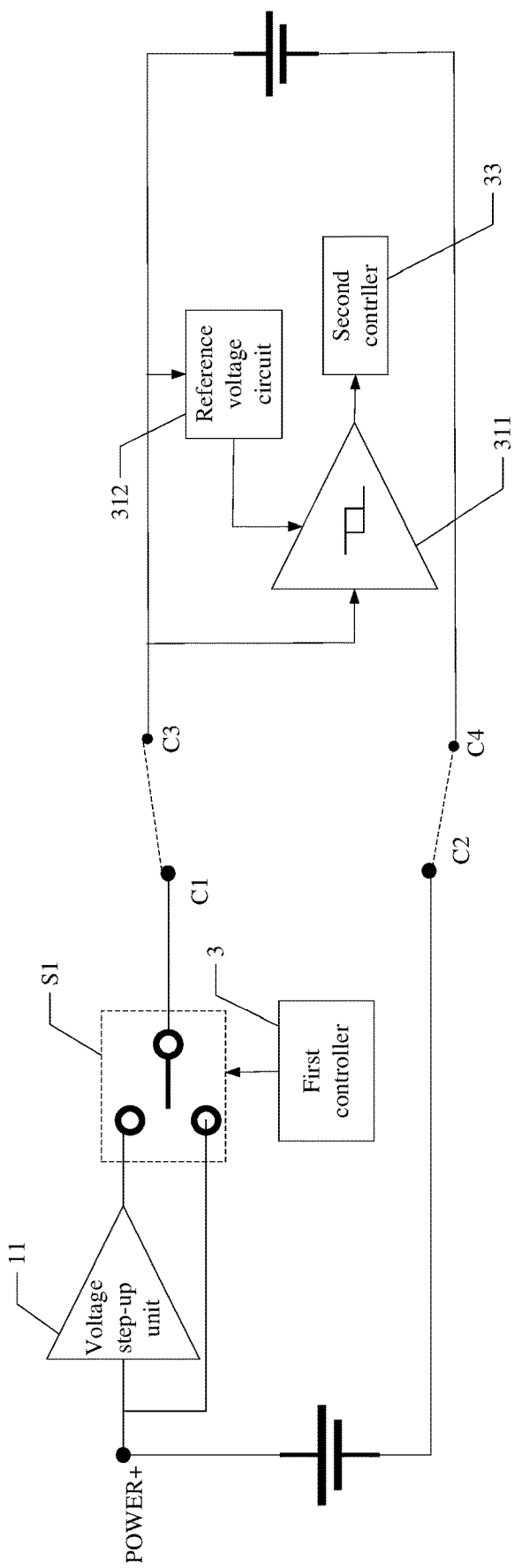
FIG. 3 is a schematic diagram of a charging and communication system according to an embodiment of this invention.

FIG. 3 shows a charging and communication system charging and communication according to an embodiment of this invention. The charging and communication system includes: a voltage step-up unit 11, an electronic switch S1, a first controller 3, a potential output terminal C1, a potential receiving terminal C3, a common ground terminal C2 (C4), a second comparator 311, a reference voltage circuit 312, and a second controller 33.

The potential output terminal C1 and the potential receiving terminal C3 are detachably connected. In a specific embodiment, the connection mode of the potential output terminal C1 and the potential receiving terminal C3 can be either an existing connection method or a connection method that may occur in the future. In an embodiment, any connection mode may be used as long as electrical signal transmission between the potential output terminal C1 and the potential receiving terminal C3 can be realized after the potential output terminal C1 and the potential receiving terminal C3 are connected.

An input of the voltage step-up unit 11 is configured to be connected to a charging power source POWER+. The voltage step-up unit 11 is configured to increase a potential of the charging power source to a first potential. A first input of the electronic switch S1 is connected to an output of the voltage step-up unit 11. A second input of the electronic switch S1 is connected to the charging power source POWER+. An output of the electronic switch S1 is connected to the potential output terminal C1.

The first controller 3 is configured to generate a first control signal. The first control signal is configured to represent a first communication information. The electronic switch S1 switches between the first input and the second input in response to the received first control signal, so as to output a first potential or a second potential alternately. The first potential is an increased potential of the charging power source POWER+. The second potential is the potential of the charging power source POWER+. Both the first potential and the second potential satisfy the potential required for the to-be-charged device. The first potential is not equal to the second potential.

An first input of the second comparator 311 is configured to be connected to the potential receiving terminal C3, a reference input of the second comparator 311 is connected to the reference voltage circuit 312, and an output of the second comparator 311 is connected to the second controller 33.

The reference voltage circuit 312 is configured to provide a reference voltage to the reference input of the second comparator 311. The first input of the second comparator 311 is configured to receive a signal set of first potentials and second potentials from the potential receiving terminal C3. The second comparator 311 compares the signal set of the first potentials and the second potentials received by the first input thereof with the reference voltage, then output a digital signal sequence. The second controller 33 is configured to obtain the first communication information according to the digital signal sequence.

For ease of understanding by a person skilled in the art, in an exemplary scenario, a charging case (a charging device) and a wireless earphone (a to-be-charged device) are used as an example for description. For example, the wireless earphone is connected to the charging case through the potential output terminal C1 and the ground terminal C2 connecting the potential receiving terminal C3 and the common ground terminal C4 respectively. The charging case supplies power to the wireless earphone through the connected terminals. In the charging process, the first controller 3 may encode a first communication information (for example, pairing with the wireless earphone) according to a preset encoding rule, to obtain a first control signal. For example, the first controller 3 compiles a first communication information into a binary code string "1010111 . . . ", and outputs the binary code string as a first control signal to the electronic switch S1. The electronic switch S1 switches between a first potential and a second potential in response to the first control signal (e.g. 1 corresponds to the first potential, 0 corresponds to the second potential, and vice versa), so that the potential of the potential output terminal C1 also switches between the first potential and the second potential. The wireless earphone receives, through the potential receiving terminal C3, the potential that switches between the first potential and the second potential (that is the above-mentioned signal set of the first potentials and the second potentials). The comparator 311 compares the first potential and the second potential with a reference voltage respectively, to obtain a high and low level digital signal sequence (e.g. output 1 when received potential is above the reference voltage and 0 below the reference voltage, and vice versa). For example, the digital signal sequence is the above binary code string "1010111 . . . ". The second controller analyzes the digital signal sequence according to a preset decoding rule to obtain the first communication information. The wireless earphone may perform a corresponding operation (such as pairing) according to the first communication information.

It should be noted that, the foregoing exemplary description merely helps a person skilled in the art to understand the technical solution, but cannot be construed as a limitation on the technical solution of this invention. For example, some application scenarios may also relate to information interaction such as battery level query and earphone alignment.

In the solution disclosed in this invention, based on the original circuit of the device, for example, for the charging device, the communication information provided by the first controller can be expressed by the cooperation of the voltage step-up unit and the electronic switch; for the to-be-charged device, the communication information transmitted by the charging device can be analyzed by using the comparator and the second controller. Compared with the prior art, the complexity of the hardware circuit structure is reduced, and communication in the charging process is implemented. The circuit structure is simple and compact. Moreover, compared with the prior art, the charging and communication system according to this embodiment of the present invention has a simple structure, and few elements are added, so that the charging and communication system according to this embodiment of the present invention improves the stability and reliability of the circuit structure compared with the prior art.

It can be known from the disclosure of the above embodiments that digital information can be expressed as long as the charging device can switch and output two different potentials. Accordingly, when the to-be-charged device analyzes these two different potentials received from the charging device and converts them into corresponding digital information, communication functions can be realized. The charging function can be performed by at least one of the first potential and the second potential being the charging potential.

Figure 4:
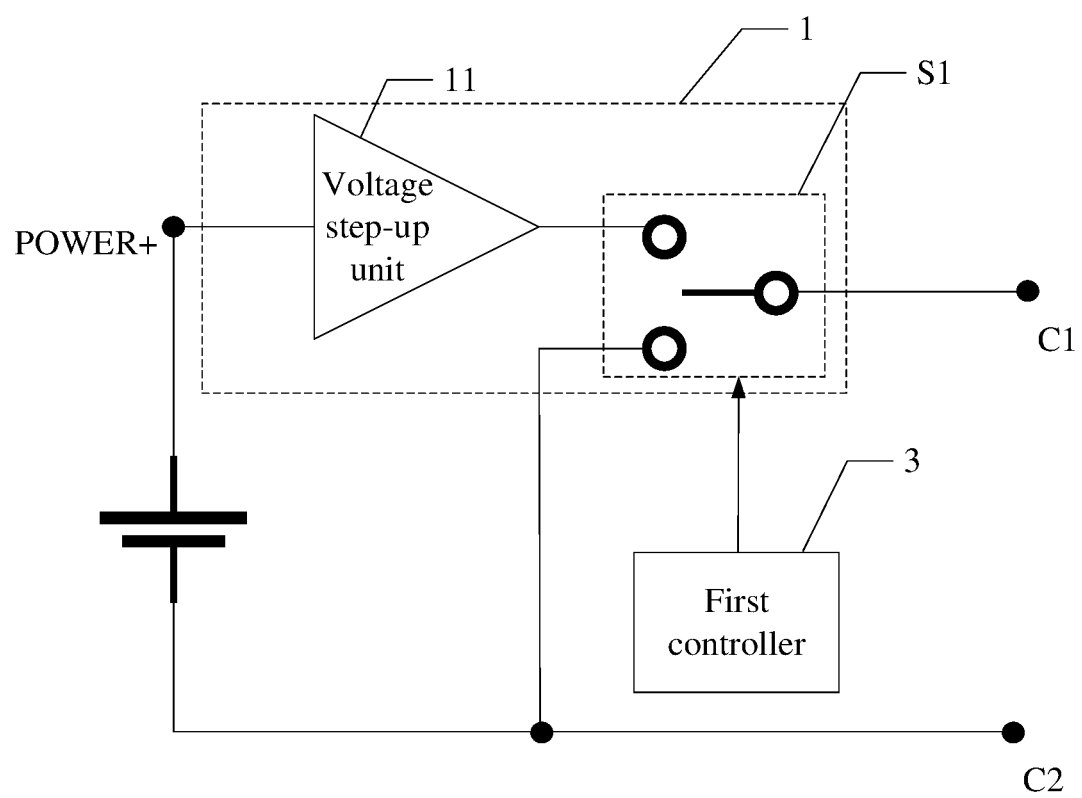
FIG. 4 is a schematic diagram of a charging and communication circuit used in a charging device according to an embodiment of this invention.

Referring to FIG. 4, as an alternative embodiment, FIG. 4 differs from FIG. 1 in that the second potential is zero potential, that is, the second input of the switch S1 is connected to the ground terminal C2.

Figure 5:
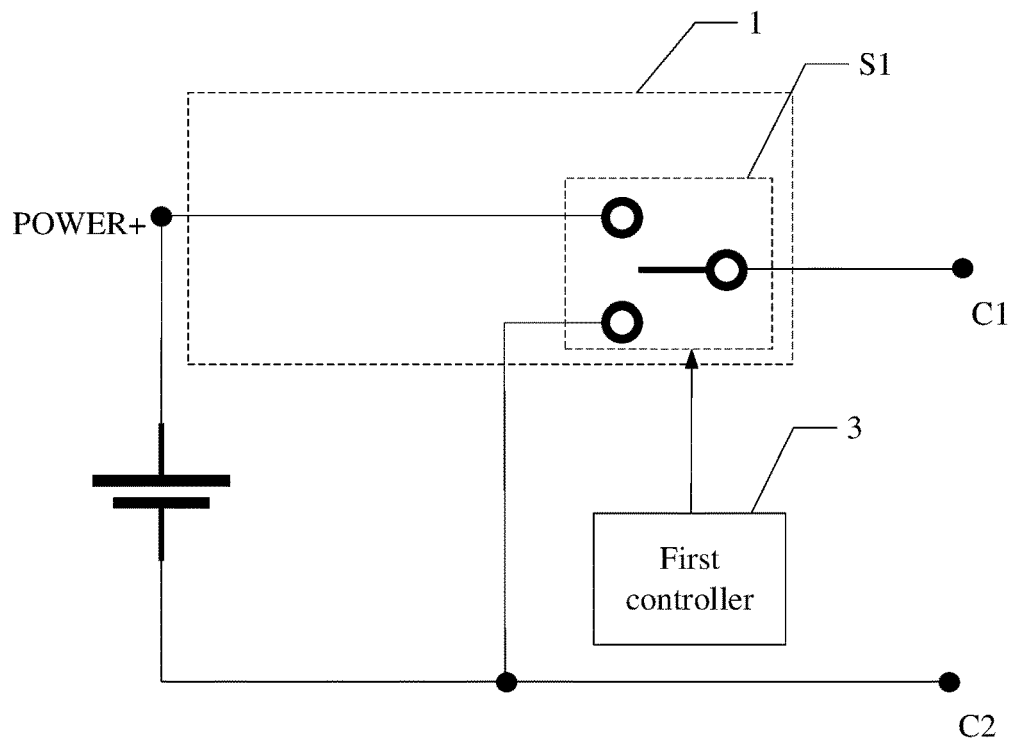
FIG. 5 is a schematic diagram of a charging and communication circuit used in a charging device according to an embodiment of this invention.

Referring to FIG. 5, as an alternative embodiment, FIG. 5 differs from FIG. 4 in that there is no voltage step-up unit in FIG. 5, and the second input of the switch S1 is still connected to the ground terminal C2.

In the embodiments of FIG. 4 and FIG. 5, the first potential and the second potential are different, so the digital information can be expressed by switching the first potential and the second potential. Since the first potential is a charging potential, and the second potential is zero potential, the to-be-charged device can be charged for at least part of the time during the process of transmitting information. The to-be-charged device can be charged by using the first potential when the potential output terminal C1 is switched to the first potential.

Figure 6:
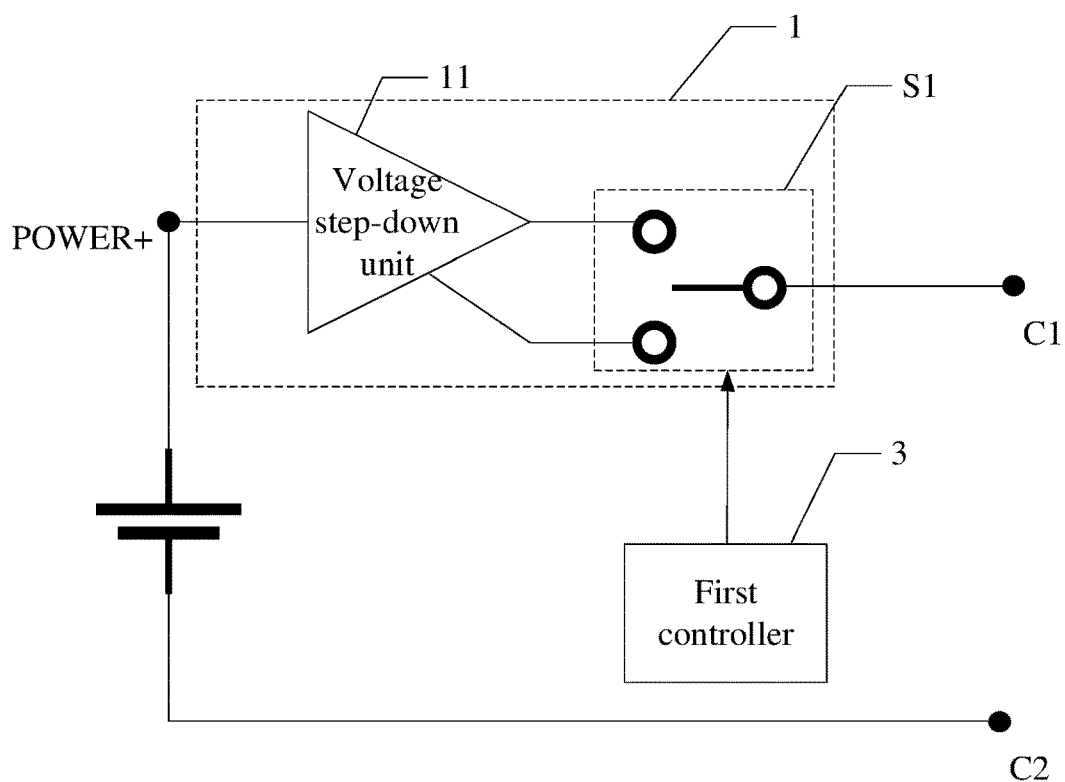
FIG. 6 is a schematic structural diagram of a charging and communication circuit used in a charging device according to an embodiment of this invention.

When the potential of the charging power source is high enough, in an optional embodiment, referring to FIG. 6, the voltage step-down unit 11 is configured to reduce the potential of the charging power source to a first potential and a second potential. That is, the first input and the second input of a first switch S1 are connected two outputs of the voltage step-down unit 11 respectively, where one output is the first potential, and the other output is the second potential.

Similarly, as a preferred embodiment, both the first potential and the second potential can satisfy the working potential required for the to-be-charged device, so that the to-be-charged device can still work on communication during charging even if it is out of power or at a low battery level.

Similarly, in the examples shown in FIG. 1-FIG. 5, in some situations, the voltage step-up unit may be replaced with a voltage step-down unit. It is to be expressly understood, that each of the figures is provided for the purpose of illustration and description only and is not intended as a definition of the limits of the present disclosure. For the sake of uniformity, the voltage step-up unit and the voltage step-down unit in FIG. 1-FIG. 6 may be collectively referred to as a voltage conversion unit.

Figure 7:
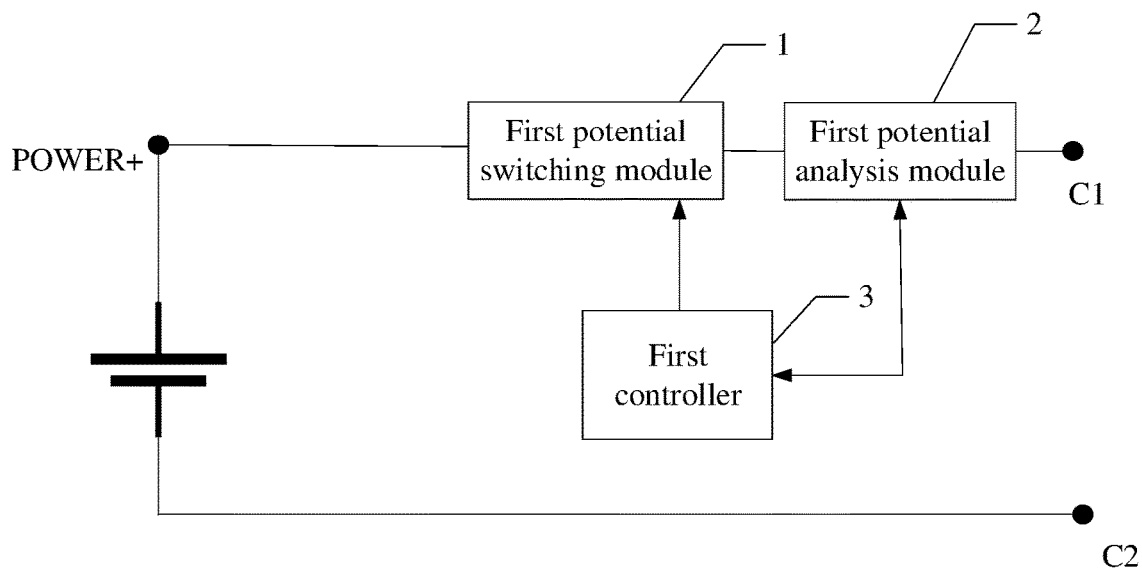
FIG. 7 is a schematic diagram of a charging and communication circuit used in a charging device according to an embodiment of this invention.

To implement bidirectional communication, the charging device may receive communication information from the to-be-charged device. In an optional embodiment, referring to FIG. 7, a charging and communication circuit of a charging device according to an embodiment of this invention includes a first potential switching module 1, a first potential analysis module 2 and a first controller 3. Compared to FIG. 1, only the first potential resolution module 2 is added. The first potential analysis module 2 is connected to the potential output terminal C1. Specifically, the first potential analysis module 2 is connected between the potential output terminal C1 and the first potential switching module 1, and controlled by the first controller 3. In an embodiment, the first potential analysis module 2 is configured to analyze electrical signals received by the potential output terminal C1 from the to-be-charged device, to obtain a signal set of first terminal potentials and second terminal potentials. In this embodiment, the terminal potential refers to a potential to ground transmitted by the to-be-charged device and received by the potential output terminal C1. In a specific embodiment, the first terminal potential is not equal to the second terminal potential, so that the signal set of the first terminal potentials and the second terminal potentials can represent a second communication information. In this embodiment, the second communication information refers to a communication information transmitted by the to-be-charged device.

It should be noted that, when the charging device transmits the power or information to the to-be-charged device, the first controller 3 may control the first potential analysis module 2 to be in a fully connected state such that the first potential switching module 1 and the potential output terminal C1 are short-circuited, to prevent load of the first potential analysis module 2 from consuming power outputted by the first potential switching module 1. For example, there is a switch and/or a controller in the first potential analysis module 2, through which the fully connected state of the first potential analysis module 2 can be controlled. Note that one or more well-known features may be omitted or simplified in order not to obscure the illustrative embodiments.

Figure 8:
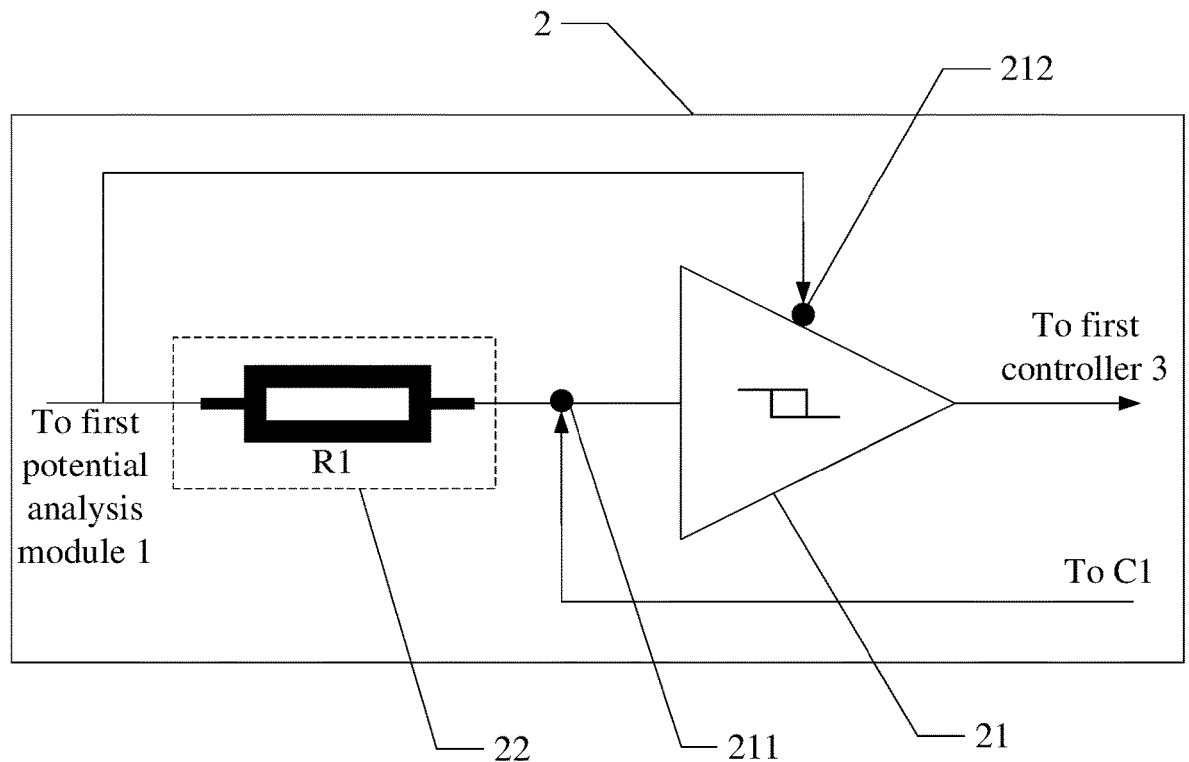
FIG. 8 is a schematic diagram of an example of a first potential analysis module according to an embodiment of this invention.

FIG. 8 shows a first potential analysis module 2 according to an embodiment. The first potential analysis module includes a first comparator 21. An input node 211 of the first comparator 21 is connected to the potential output terminal C1. The first comparator 21 receives a signal set of the first terminal potentials and the second terminal potentials from the potential output terminal C1, and compares with a reference potential to obtain a comparison result. The comparison result is a digital signal sequence. Specifically, because the first terminal potential is not equal to the second terminal potential, a reference potential is set between the first terminal potential and the second terminal potential. After the first terminal potential and the second terminal potential are compared with the reference potential, high-level and low-level digital signals may be outputted. That is, the signal set representing the second communication information can be converted into a digital signal sequence. Such digital signal sequence may be read by a logic controlling element or a controller. In an optional embodiment, the first comparator 21 may be a common comparator in the existing technology, and is preferably a Schmitt trigger, so as to reduce glitches of output signal after comparison.

Generally, the to-be-charged device has a relatively stable current in the charging process. Therefore, the to-be-charged device may use the current to represent the communication information. To adapt to analyze the communication information which is represented by the current signal received by the potential output terminal C1 from the to-be-charged device, referring to FIG. 8, the first potential analysis module 2 may further include an I/V conversion circuit 22. The I/V conversion circuit 22 is connected to the potential output terminal C1. Specifically, the I/V conversion circuit 22 may be connected between the potential output terminal C1 (input node 211) and a reference node 212. In this embodiment, the I/V conversion circuit 22 is configured to convert the current signal received by the potential output terminal C1 into a voltage signal which is inputted to the first comparator 21.

Referring to FIG. 8, in a specific embodiment, the I/V conversion circuit 22 includes an I/V conversion resistor R1. One end of the I/V conversion resistor R1 is connected to the potential output terminal C1 and the input node 211 of the comparator, and the other end of the I/V conversion resistor R1 is connected to the reference node 212 of the first comparator.

In a specific embodiment, the first controller 3 is connected to the first potential analysis module 2. The first controller 3 obtains a second communication information based on the digital signal sequence from the first potential analysis module 2. In an embodiment, after receiving the digital signal sequence, the first controller 3 may analyze the digital signal sequence from the first potential analysis module 2 according to a decoding rule that is compatible with d the to-be-charged device, to obtain a second communication information.

Figure 9:
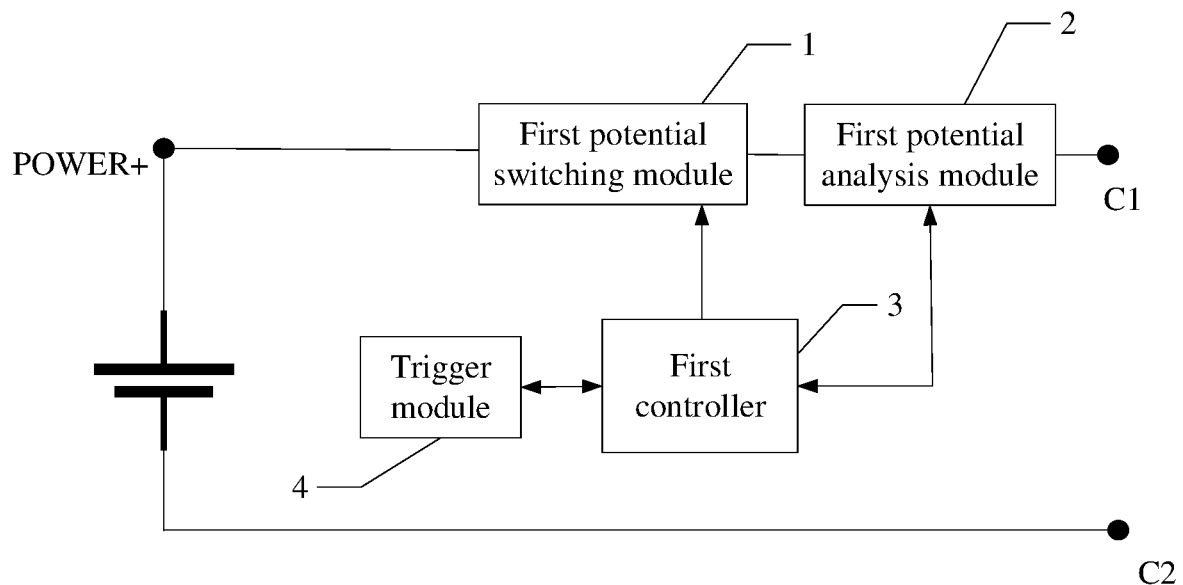
FIG. 9 is a schematic diagram of a charging and communication circuit used in a charging device according to an embodiment of this invention.

In an optional embodiment, referring to FIG. 9, the charging and communication circuit according to an embodiment further includes a trigger module 4, compared with FIG. 8. The trigger module 4 is connected to the first controller 3. The first controller 3 generates the first control signal when being triggered by the trigger module 4. In a specific embodiment, the trigger module 4 may be a touch screen and/or a physical button, or may be a speech recognition module or an action capture module, and may also be any other existing or future man-machine interaction module that can implement trigger control. In a specific implementation process, the trigger module 4 may be one type of module, or may be a combination of multiple types of modules. In an embodiment, the first controller 3 may pre-store one or more first control signal instructions, for example, "battery level query", "Bluetooth pairing" and "earphone alignment". After that, the trigger module 4 can extract the preset first control signal instruction, to send a first control signal corresponding to the first control signal instruction. In some scenarios, first control signals may also be generated at preset time intervals. Specifically, the preset time intervals may be equal intervals or may be unequal intervals. In another embodiment, the first control signal instruction may also be generated by the trigger module 4, and then the first controller 3 generates the first control signal corresponding to the first control signal instruction according to the trigger module 4.

It should be noted that, when the trigger module 4 has a bidirectional interaction function, for example, output functions such as displaying, presenting, and audio playing, the control signal of the trigger module 4 may also come from the first controller 3.

It should be noted that, in a specific implementation process, the first controller 3 and an existing controller in a charging device may be the same controller, or may be controllers disposed independently.

Figure 10:
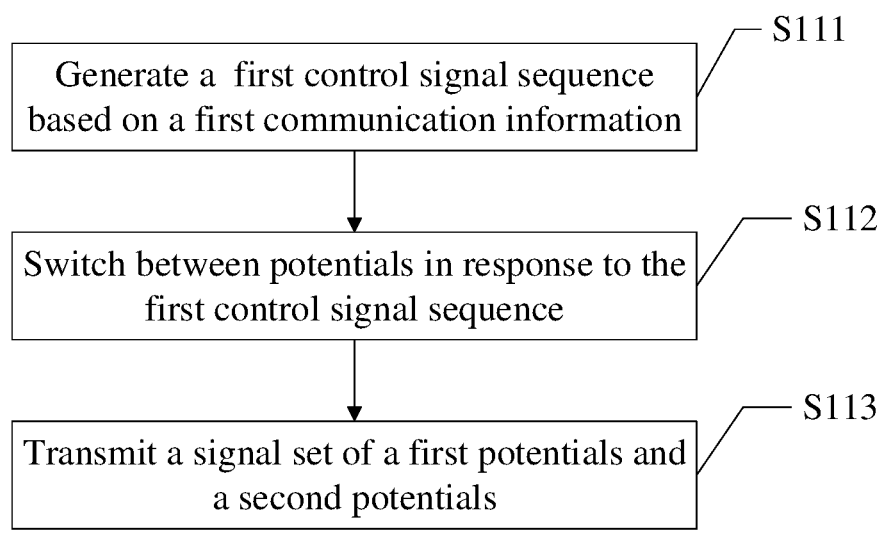
FIG. 10 is a flowchart of a charging and communication method used for a charging device according to an embodiment of this invention.

FIG. 10 is a flowchart of a charging and communication method applicable to a charging device according to an embodiment of this invention.

At step S111, a first control signal sequence is generated based on a first communication information. In a specific embodiment, a first controller 3 generates a first control signal sequence based on a first communication information and transmits the first control signal sequence to a first potential switching module 1. In an embodiment, the first control signal sequence is a binary signal sequence. In a specific implementation process, after the first controller 3 completes generation of a sequence of the first control signal based on the first communication information, and then transmits the sequence of the first control signal together to the first potential switching module 1. Alternatively, the first controller 3 may generate the first control signals one by one based on the first communication information and transmit the first control signals one by one to the first potential switching module 1, that is, the first controller 3 transmits one control signal immediately after the control signal is generated.

At step S112, potentials are switched sequentially in response to the first control signal sequence. In an embodiment, the first potential switching module 1 switches between a first potential and a second potential sequentially in response to the first control signal sequence. Therefore, the first control signal sequence is expressed by a signal set of the first potentials and the second potentials formed by means of switching between the first potential and the second potential, that is, first communication information is represented.

At step S113, the signal set of first potentials and second potentials is transmitted. In an embodiment, the first potential switching module 1 is connected to a potential output terminal C1. Therefore, the potential output terminal C1 can receive the first potential and the second potential provided by the first potential switching module 1. Therefore, after being connected to a to-be-charged device, the potential output terminal C1 can transmit the signal set of the first potentials and the second potentials to the to-be-charged device. In an embodiment, at least one of the first potential and the second potential is a charging potential, so as to supply power to the to-be-charged device. Moreover, the first potential is not equal to the second potential, and they are constantly switched to indicate 0 or 1 as mentioned above, so that information is transmitted to the to-be-charged device in the process of charging the to-be-charged device.

Figure 11:
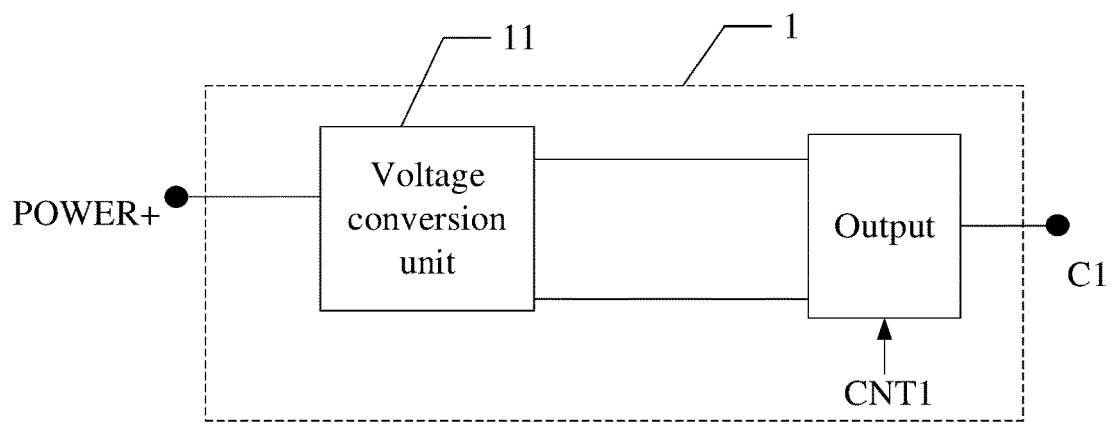
FIG. 11 is a schematic diagram of a potential switching circuit used for a charging and communication circuit according to an embodiment of this invention.

FIG. 11 is a schematic diagram of a potential switching circuit used in a charging and communication circuit according to an embodiment of this invention. The potential switching circuit includes a potential switching module 1.

The potential switching module 1 is configured to output a first potential or a second potential alternately. In a specific embodiment, the potential switching module 1 may have a built-in controller or connect to an external controller. An input of the potential switching module 1 is configured to be connected to an external charging power source POWER+, and adjust the potential of the charging power source POWER+ to be the first potential and the second potential, that is, the potential switching module 1 may output the first potential or the second potential. In an embodiment, the potential switching module 1 outputs the first potential or the second potential alternately under the control of a first control signal CNT1. In a specific embodiment, one of the first potential and the second potential may be the potential of the external charging power source POWER+. In an embodiment, at least one of the first potential and the second potential is a charging potential. In this embodiment, the charging potential refers to a potential that can charge a to-be-charged device. At least one of the first potential and the second potential is the charging potential, so that the potential outputted by the potential switching module 1 can supply power to the to-be-charged device. In a specific embodiment, the first potential is not equal to the second potential, so that information is transmitted to the to-be-charged device in the process of charging the to-be-charged device.

It should be noted that, in an embodiment, the first control signal CNT1 may be from a built-in controller or from an external controller. In an embodiment, the first control signal CNT1 can represent the first communication information. That is, the first communication information is encoded according to a preset rule to form high-level and low-level digital signals, and a set formed by the digital signals can represent the first communication information. It should be appreciated by a person skilled in the art that, this embodiment does not limit the specific content of the first communication information.

In a specific embodiment, the switching module 1 includes a voltage conversion unit 11. An input of the voltage conversion unit 11 is connected to an electrode of the external charging power source POWER+. The voltage conversion unit 11 is configured to convert the potential of the external charging power source POWER+ into the first potential. In some embodiments, the voltage conversion unit 11 may also convert the potential of the external charging power source POWER+ into the first potential and the second potential.

Figure 12:
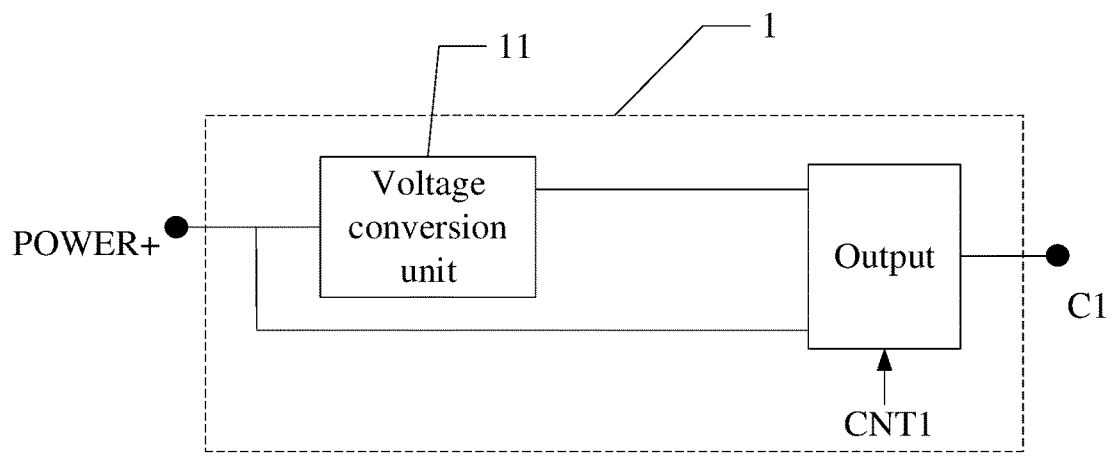
FIG. 12 is a schematic diagram of a potential switching circuit used for a charging and communication circuit according to an embodiment of this invention.
Figure 13:
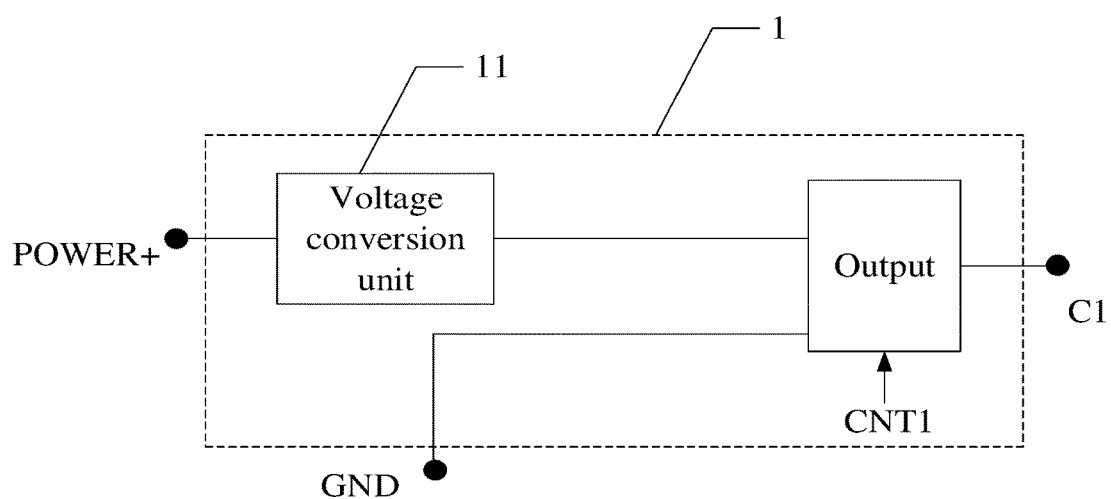
FIG. 13 is a schematic diagram of a potential switching circuit used for a charging and communication circuit according to an embodiment of this invention.

In an optional embodiment, the voltage conversion unit 11 is a voltage step-up unit. The second potential is the potential of the external charging power source POWER+, and the first potential is a potential after the voltage step-up unit 11 boosts the charging power source. In an embodiment, referring to FIG. 11, the first potential and the second potential are potentials after the voltage step-up unit 11 boosts the charging power source. That is, the voltage step-up unit 11 increases the potential of the charging power source POWER+ and obtain two potentials, such as the first potential and the second potential. In another embodiment, refer-ring to FIG. 12, the second potential is the potential of the charging power source POWER+.

In an optional embodiment, the voltage conversion unit 11 is a voltage step-down unit. Referring to FIG. 11, the voltage step-down unit is configured to reduce the potential of the charging power source POWER+ to the first potential and the second potential. Similarly, the voltage step-down unit may also reduce the potential of the charging power source POWER+ to the first potential (or the second potential). The second potential (or the first potential) multiplexes another potential in the circuit which is different from the first potential (or the second potential).

In a preferred embodiment, both the first potential and the second potential can satisfy a potential required for the to-be-charged device working in a communication process, so that the to-be-charged device can also implement communication by means of the first potential and the second potential even if the device is out of power or at a low battery level.

In an optional embodiment, one of the first potential and the second potential is a ground (GND) potential. It should be noted that, when one of the first potential and the second potential is the ground (GND) potential, the other should be the charging potential. Moreover, in this embodiment, the to-be-charged device should have an independent power supply or battery, so as to complete the communication operation; or start communication after a period of charging.

Figure 14:
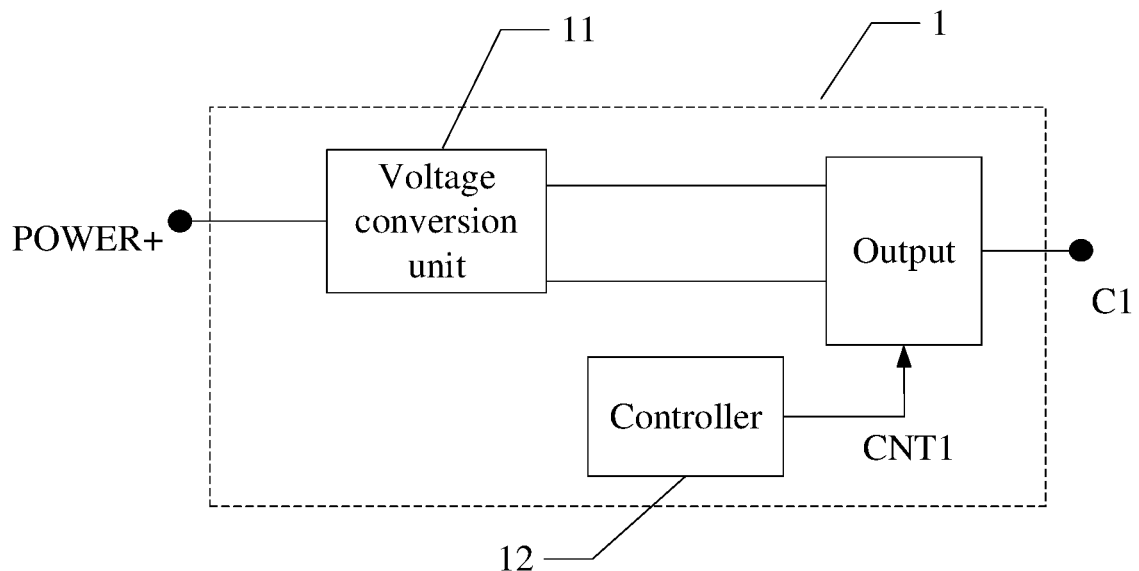
FIG. 14 is a schematic diagram of a potential switching circuit used for a charging and communication circuit according to an embodiment of this invention.

In a specific embodiment, the potential switching module 1 outputs the first potential and the second potential alternately based on the first communication information. Specifically, referring to FIG. 14, the potential switching circuit disclosed in an embodiment further includes a controller 12. The controller 12 is configured to generate a first control signal based on the first communication information. The potential switching module 1 outputs the first potential and the second potential alternately in response to the first control signal. The controller may be a logic control circuit, or may be a processing unit having a data processing capability, for example, a single-chip microprocessor, a DSP, or a CPU. In a specific embodiment, the potential switching circuit may further include an electronic switch. The electronic switch switches between conduction with the first potential and conduction with the second potential in response to the first control signal, so as to output the first potential and the second potential alternately.

It should be noted that, the controller 12 may be a built-in control unit. The controller 12, the voltage conversion unit 11, and the electronic switch are integrated into the potential switching module 1. The controller 12 may also be an external controller, that is, the first control signal is from the external controller, and the controller 12 is packaged independently from the voltage conversion unit 11 and the electronic switch.

Figure 15:
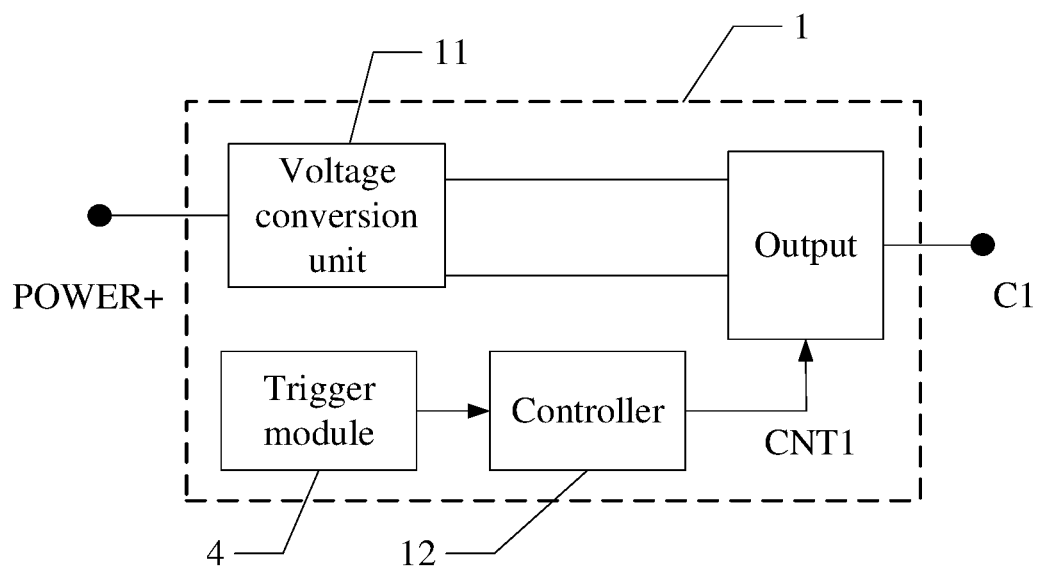
FIG. 15 is a schematic diagram of a potential switching circuit used for a charging and communication circuit according to an embodiment of this invention.

In an optional embodiment, referring to FIG. 15, the potential switching circuit may further include a trigger module 4. The trigger module 4 is connected to the controller. The controller generates the first control signal according to the first communication information when being triggered by the trigger module 4. It should be noted that, the trigger module 4 may be integrated into the potential switching module 1 together with the controller 12, the voltage conversion unit 11, and the electronic switch. The trigger module 4 may also be packaged independently from the controller 12, the voltage conversion unit 11, and the electronic switch.

In a specific embodiment, the trigger module 4 may be a touch screen and/or a physical button, or may be a speech recognition module or an action capture module, and may also be any other existing or future man-machine interaction module that can implement trigger control. In a specific implementation process, the trigger module 4 may be one type of module, or may be a combination of multiple types of modules. In an embodiment, the controller 12 may pre-store one or more first control signal instructions, for example, "battery level query", "Bluetooth pairing" and "earphone alignment". After that, the trigger module 4 may extract the preset first control signal instruction, to send the first control signal corresponding to the first control signal instruction. In some scenarios, first control signals may also be generated at preset time intervals. Specifically, the preset time intervals may be equal intervals or may be unequal intervals. In another embodiment, the first control signal instruction may also be generated by the trigger module 4, and then the controller 12 generates the first control signal corresponding to the first control signal instruction according to the trigger module 4.

The potential switching circuit used for the charging and communication circuit disclosed in this embodiment of the present invention is configured to output the first potential and the second potential alternately. On one hand, at least one of the first potential and the second potential is a charging potential. Therefore, the to-be-charged device can be charged by using the potential outputted by the potential switching circuit. On the other hand, the first potential is not equal to the second potential. Therefore, in the process of charging the to-be-charged device, information can be transmitted to the to-be-charged device. That is, the potential switching circuit switches between the first potential and the second potential, so that both charging and communication can be implemented in the charging process. Compared with the prior art, only the potential switching module is added in the charging and communication circuit, which reduces the complexity of a hardware circuit structure. The circuit structure is simple and compact. Compared with the prior art, the structure is simple, and few elements are added, so that the present invention improves the stability and reliability of the circuit structure compared with the prior art.

Referring to FIG. 4 to FIG. 7 and FIG. 9, a charging device is disclosed. The charging device includes a charging and communication circuit disclosed in any of the foregoing embodiments. In an embodiment, the charging device may be a mobile power source or a charging case. In a specific embodiment, the charging device may further include a first battery, which is detachably or fixedly connected to an electrode of a charging power source POWER+, so as to provide charging power through the electrode of the charging power source. It should be noted that, in some embodiments, the charging device may further include an external power source interface, configured to receive external charging power provided by an external power source. The external charging power may be used by the charging device for operation, or charge the first battery of the charging device, and may also provide charging power for the charging power source POWER+. In some embodiments, when other modules in the charging device also have a controller, the charging and communication circuit may share the controller with the other modules.

Figure 16:
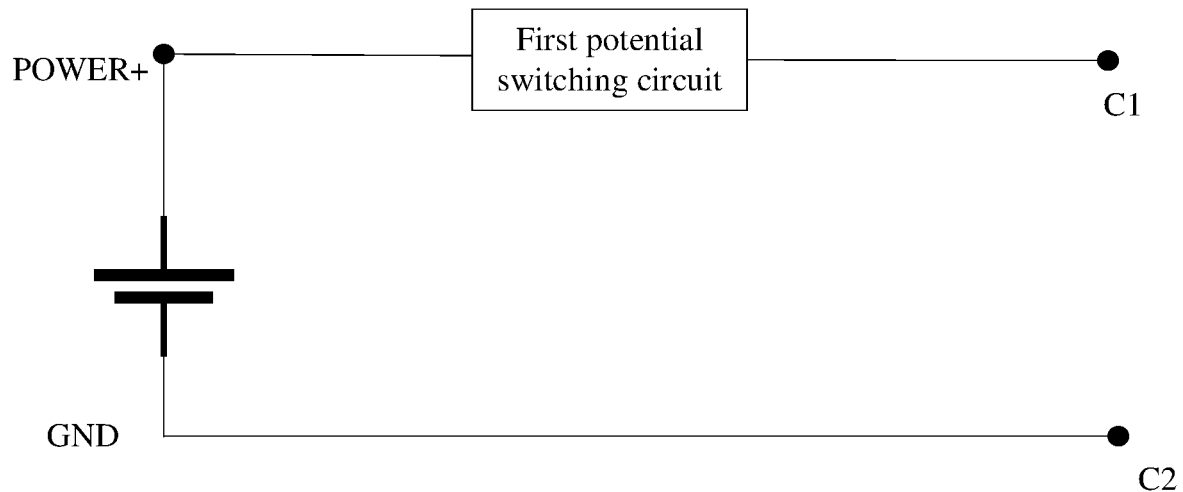
FIG. 16 is a schematic diagram of an example of a charging device according to an embodiment of this invention.

FIG. 16 shows a charging device. The charging device includes a potential switching circuit according to any of the foregoing embodiments. In an embodiment, the charging device may be a mobile power source or a charging case. In a specific embodiment, the charging device may further include a first battery, which is detachably or fixedly connected to an electrode of a charging power source POWER+, so as to provide charging power through the electrode of the charging power source. It should be noted that, in some embodiments, the charging device may further include an external power source interface, configured to receive external charging power provided by an external power source. The external charging power may be used by the charging device for operation, or charge the first battery of the charging device, and may also provide charging power for the charging power source POWER+. In some embodiments, when other modules in the charging device also have a controller, the potential switching circuit may share the controller with the other modules.

Figure 17:
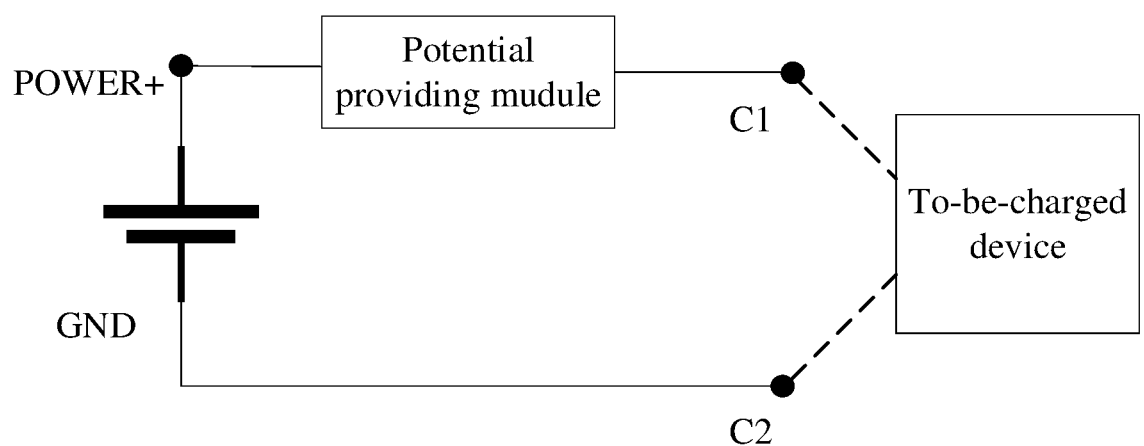
FIG. 17 is a schematic diagram of an example of a charging device according to an embodiment of this invention.

FIG. 17 shows a charging device. In a specific embodiment, the charging device may be a mobile power source or a charging case. In this embodiment, the charging device includes a potential output terminal C1, configured to be connected to a to-be-charged device. After the potential output terminal C1 and a ground C2 are connected to the to-be-charged device, the potential output terminal C1 and the ground C2 form a loop with the to-be-charged device end. The potential output terminal C1 may supply power to the to-be-charged device. In the process of charging the to-be-charged device through the potential output terminal C1, the potential of the potential output terminal C1 switches between a first potential and a second potential in at least a partial period of time. At least one of the first potential and the second potential is a charging potential, so as to supply power to the to-be-charged device. The first potential is not equal to the second potential, so that information is transmitted to the to-be-charged device in the process of charging the to-be-charged device.

It should be noted that, in a specific implementation process, the alternating first potential and second potential provided by the potential output terminal C1 in the charging device may be implemented by using a potential providing module. In a specific embodiment, the potential providing module may be implemented by the solution of any of the foregoing embodiments of the charging and communication circuit or the potential switching circuit. In an embodiment, an operating power of the potential providing module may be provided by a charging power source POWER+, or may be provided by a battery in the charging device. It should be noted that, in some embodiments, when the charging device includes an analysis module, an electrical signal transmitted from outside (for example, the to-be-charged device) may be received through the potential output terminal C1, and then the received external electrical signal is analyzed to obtain received communication information. For details, reference may be made to the description of the foregoing embodiment. Details are not described herein again.

In the charging device disclosed, the potential output terminal that provides power is multiplexed, and the potential of the potential output terminal switches between the first potential and the second potential in at least a partial period of time in the process of charging the to-be-charged device through the potential output terminal. On one hand, at least one of the first potential and the second potential is the charging potential. Therefore, the to-be-charged device can be charged. On the other hand, the first potential is not equal to the second potential. Therefore, in the process of charging the to-be-charged device, information can be transmitted to the to-be-charged device. That is, by multiplexing the potential output terminal that provides the power source so that the potential output end switches between the first potential and the second potential, both charging and communication can be implemented. Compared with the prior art in which, without addition of a signal output terminal, a single charging mode or a single communication mode needs to be performed in series, the solution of this invention can implement charging and communication in parallel in the same period of time without adding a signal output terminal. Moreover, compared with the solution of both charging and communication by means of multiple contacts, this invention reduces the complexity of a hardware circuit structure. The circuit structure is simple and compact. Compared with the prior art, this invention has a simple structure, and few elements are added, so that the charging device according to the present invention improves the stability and reliability of the circuit structure compared with the prior art.

Figure 18:
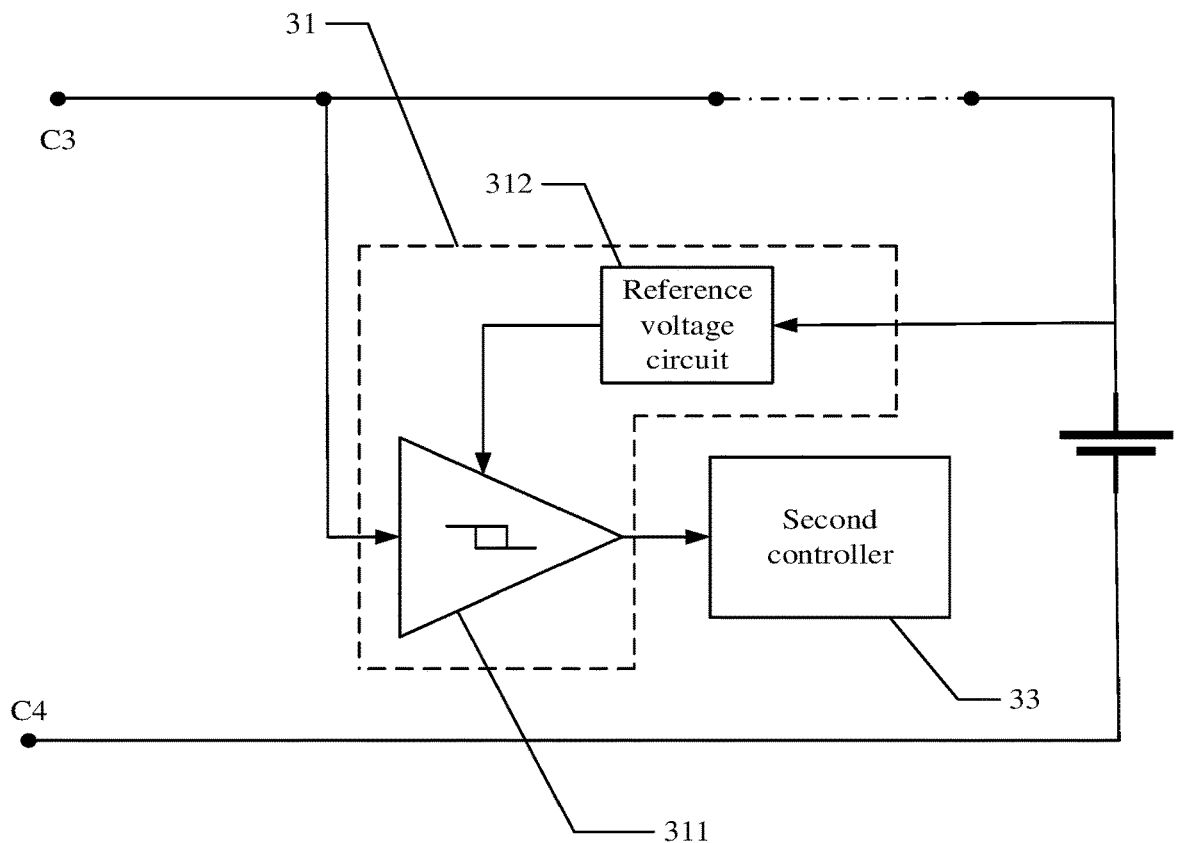
FIG. 18 is a schematic diagram of a charging and communication circuit used for a to-be-charged device according to an embodiment of this invention.

FIG. 18 is a schematic diagram of a charging and communication circuit used in a to-be-charged device according to an embodiment of this invention. The to-be-charged device usually includes a potential receiving terminal C3 and a common ground terminal C4. The common ground terminal C4 is configured to, after being connected to a charging device, connect the charging device and a to-be-charged device to a common ground. After the potential receiving terminal C3 and the common ground terminal C4 are connected to power terminals (e.g. C1 and C2) of the charging device respectively, the to-be-charged device and the charging device form a loop. The to-be-charged device may receive, through the potential receiving terminal C3 and the common ground terminal C4, power supplied by the charging device. The charging and communication circuit includes: a potential receiving terminal C3 and a second potential analysis module 31.

The potential receiving terminal C3 is configured to, after being connected to a charging device, receive power from the charging device. In an embodiment, a connection mode between the potential receiving terminal C3 and a power terminal of the charging device is not limited, as long as the potential receiving terminal C3 can receive power from the charging device after the potential receiving terminal C3 is connected to the power terminal of the charging device. The power received by the potential receiving terminal C3 may be input to a power source electrode (as shown by the dotted line in FIG. 18) of the to-be-charged device, to supply power to the to-be-charged device or charge a battery of the to-be-charged device. In a specific implementation process, the potential receiving terminal C3 may also be connected to the power source electrode of the to-be-charged device through other elements or modules (such as a charging control module). In an embodiment, the received power is configured as a signal set of first potentials and second potentials in at least a partial period of time. At least one of the first potential and the second potential is a charging potential, so as to supply power to the to-be-charged device.

The second potential analysis module 31 is connected to the potential receiving terminal C3. In this embodiment, the second potential analysis module 31 is configured to analyze the signal set of the first potentials and the second potentials to obtain a digital signal sequence. The first potential is not equal to the second potential, so as to obtain information transmitted by the charging device. Specifically, because the first potential is not equal to the second potential, the signal set of the first potentials and the second potentials can represent communication information. In this embodiment, the second potential analysis module 31 analyzes the signal set of the first potentials and the second potentials to obtain a digital signal sequence, where the digital signal sequence can represent the information transmitted by the charging device. For example, the charging device encodes a first communication information (for example, "battery level query", "accessory pairing", "earphone alignment" and "battery level of the charging device") thereof according to a preset encoding rule, to form a digital signal sequence. Then, the digital signal sequence is represented by a signal set of first potentials and second potentials. After analyzing the signal set of the first potentials and the second potentials, the second potential analysis module 31 can obtain the digital signal sequence transmitted by the charging device, that is, obtain the first communication information transmitted by the charging device.

In the charging and communication circuit disclosed in this embodiment, the potential receiving terminal that receives power is multiplexed, and the received power is configured as the signal set of the first potentials and the second potentials in at least a partial period of time. On one hand, at least one of the first potential and the second potential is the charging potential. Therefore, the charging power can be provided to the to-be-charged device. On the other hand, the first potential is not equal to the second potential. Therefore, in the process of receiving power from the charging device, the second potential analysis module can analyze the signal set of the first potentials and the second potentials to obtain a digital signal sequence, thus obtaining information transmitted by the charging device. That is, by multiplexing the potential receiving terminal and by using the second potential analysis module, both charging and communication can be implemented. Compared with the prior art in which, without addition of a signal receiving terminal, a single charging mode or a single communication mode needs to be performed in series, the solution of this invention can implement charging and communication information in parallel in the same period of time without adding a signal output terminal. Moreover, compared with the solution of both charging and communication by means of multiple contacts, this invention reduces the complexity of a hardware circuit structure. The circuit structure is simple and compact. Compared with the prior art, this invention has a simple structure, and few elements are added, so that the charging and communication circuit according to the present invention improves the stability and reliability of the circuit structure compared with the prior art.

In a specific embodiment, referring to FIG. 18, the second potential analysis module 31 includes a second comparator 311. An input of the second comparator 311 is connected to the potential receiving terminal C3. In an embodiment, the second comparator 311 compares the signal set of the first potentials and the second potentials received by the input thereof with a reference potential to obtain a digital signal sequence. Specifically, because the first potential is not equal to the second potential, a reference potential is set between the first potential and the second potential. High-level and low-level digital signals may be outputted after the first potential and the second potential are compared with the reference potential. That is, the signal set of the first potentials and the second potentials representing first communication information may be converted into a digital signal sequence. Such digital signal sequence may be read by a logic controlling element or a controller. In an optional embodiment, the second comparator 311 may be a common comparator in the existing technology, and is preferably a Schmitt trigger, so as to reduce glitches of output signal after comparison. In a specific implementation process, each time a first potential or a second potential is received, the second comparator 311 may compare the first potential or the second potential with the reference potential to obtain a digital signal.

In a specific embodiment, referring to FIG. 18, the second potential analysis module 31 includes: a reference voltage circuit 312. The reference voltage circuit 312 is connected to a reference potential input of the second comparator 311. The reference voltage circuit 312 is configured to provide the reference potential to the second comparator 311.

In a preferred embodiment, both the first potential and the second potential can satisfy the potential required for the to-be-charged device working in a communication process, so that the to-be-charged device can also implement communication during charging even if the device is out of power or at a low battery level.

In a specific embodiment, referring to FIG. 18, the charging and communication circuit further includes a second controller 33. The second controller 33 is connected to the output of the second potential analysis module 31. The second controller 33 is configured to obtain, according to the digital signal sequence from the second potential analysis module 31, information transmitted by the charging device. In an embodiment, the second controller 33 may decode the digital signal sequence by using a decoding rule consistent with the encoding rule of the charging device, to obtain the information transmitted by the charging device.

Figure 19:
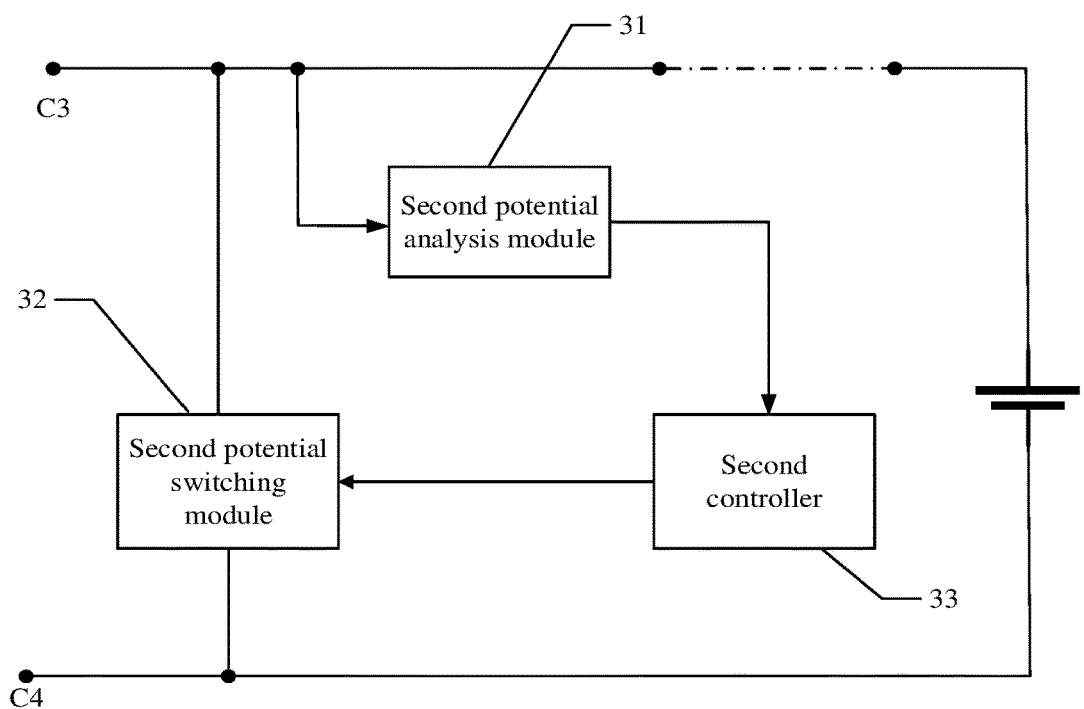
FIG. 19 is a schematic diagram of a charging and communication circuit used for a to-be-charged device according to an embodiment of this invention.

To implement transmission of information to a charging device, in an optional embodiment, referring to FIG. 19, the charging and communication circuit of a to-be-charged device further includes a second potential switching module 32 compared with FIG. 18. The second potential switching module 32 is connected between the potential receiving terminal C3 and the common ground terminal C4. The second potential switching module 32 is further connected to the second controller 33. In an embodiment, the second controller 33 is further configured to generate a second control signal. The second potential switching module 32 switches a potential of the potential receiving terminal C3 between a first terminal potential and a second terminal potential in response to the second control signal. In this embodiment, the terminal potential refers to the potential of the potential receiving terminal C3. In a specific embodiment, the first terminal potential is not equal to the second terminal potential, so that information can be transmitted to the charging device. In a specific embodiment, the second control signal may be provided by the controller of the charging and communication circuit or may be provided by an external controller. The second control signal may also be provided by an input/output device (I/O device, for example, a physical button).

In an embodiment, the second potential switching module 32 may include a variable resistor (not shown in the figure). The variable resistor is connected between the potential receiving terminal C3 and the common ground terminal C4. A resistance value of the variable resistor switches between a first resistance value and a second resistance value according to the received second control signal. The first resistance value is not equal to the second resistance value. In this embodiment, the first resistance value is not equal to the second resistance value, so that the potential at the potential receiving terminal C3 switches as the resistance value of the variable resistor switches. Thus, the potential receiving terminal C3 can form a signal set of the first terminal potentials and the second terminal potentials based on a second control signal sequence, thereby representing a second communication information.

In another embodiment, the second potential switching module 32 may include a switch circuit. The switch circuit is connected between the potential receiving terminal C3 and the common ground terminal C4. The switch circuit switches an on-off state between ON and OFF according to the received second control signal. In this embodiment, the switch circuit switches the on-off state between ON and OFF according to the received second control signal, so that the potential at the potential receiving terminal C3 switches between a low potential and a high potential as the switch circuit switches between ON and OFF. Thus, the potential receiving terminal C3 can form a signal set of the first terminal potentials and the second terminal potentials based on a second control signal sequence, thereby representing a second communication information. In a specific embodiment, the switch circuit may be implemented by using a switch device, for example, an electronic switch or a transistor.

Figure 20:
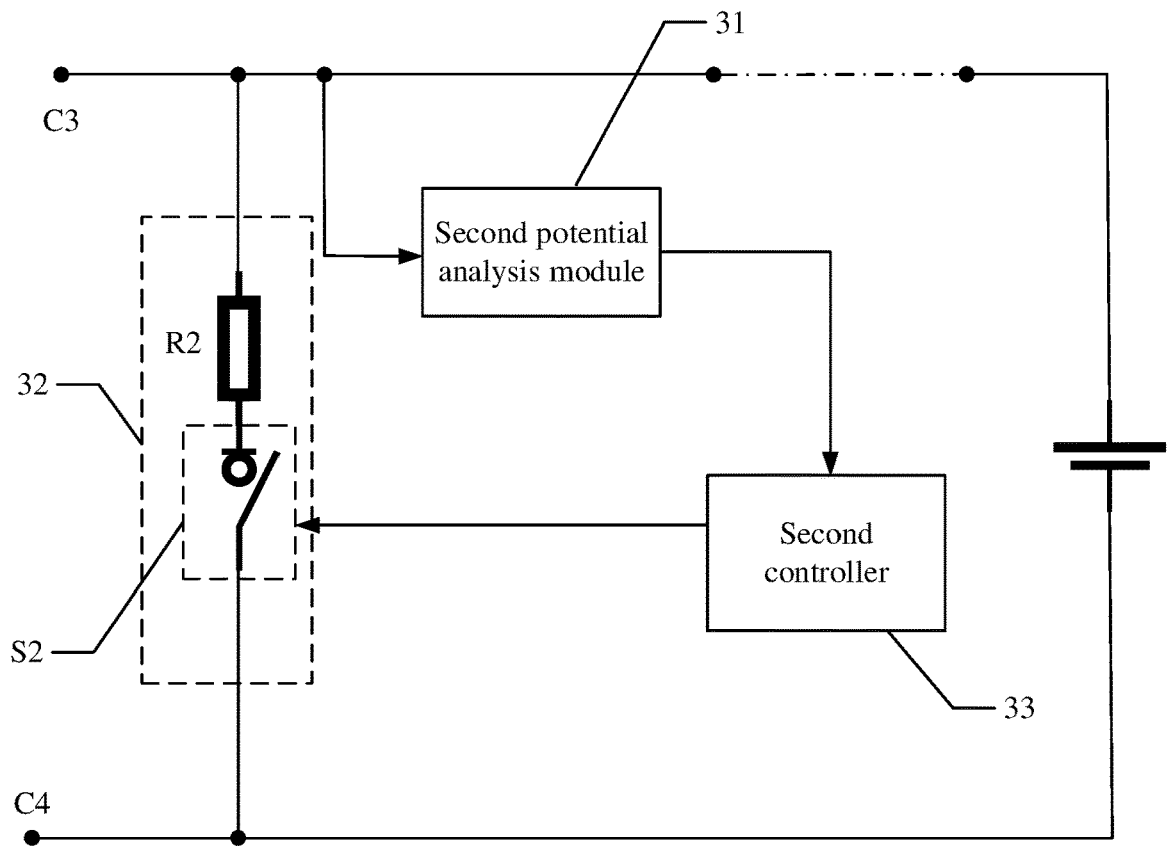
FIG. 20 is a schematic diagram of a charging and communication circuit used for a to-be-charged device according to an embodiment of this invention.

FIG. 20 shows a switch circuit according to an embodiment. The switch circuit includes a resistor R2 and a switch device S2. The switch device S2 and the resistor R2 are connected in series between the potential receiving terminal C3 and the common ground terminal C4. The switch device S2 switches an ON/OFF state according to the second control signal.

In an embodiment, the switch device S2 may be an electronic switch, and the electronic switch switches the ON/OFF state according to the received second control signal.

In another embodiment, the switch device is a transistor. A first electrode (such as the source) and a second electrode (such as the drain) of the transistor are connected in series with the resistor between the potential receiving terminal C3 and the common ground terminal C4. A control electrode (such as the gate) of the transistor switches the ON/OFF state according to the received second control signal. It should be noted that, in this embodiment, the type of the transistor is not limited. The transistor may be an NPN-type transistor or a PNP-type transistor; the transistor may be a bipolar transistor or a field effect transistor, as long as the transistor can implement an ON/OFF state switching function.

In an embodiment, the switch device S2 switches the ON/OFF state according to the received second control signal, so that the potential at the receiving terminal C3 switches between a high potential and a low potential as the switch device S2 switches between ON and OFF. Thus, a signal set of the first terminal potentials and the second terminal potentials based on a second control signal sequence can formed on the potential receiving terminal C3, thereby representing a second communication information.

This invention also discloses a charging and communication method used in a to-be-charged device. In a to-be-charged device, a second potential analysis module 31 receive power from a charging device through the potential receiving terminal C3. The power is configured as a signal set of first potentials and second potentials in at least a partial period of time. At least one of the first potential and the second potential is a charging potential.

Figure 21:
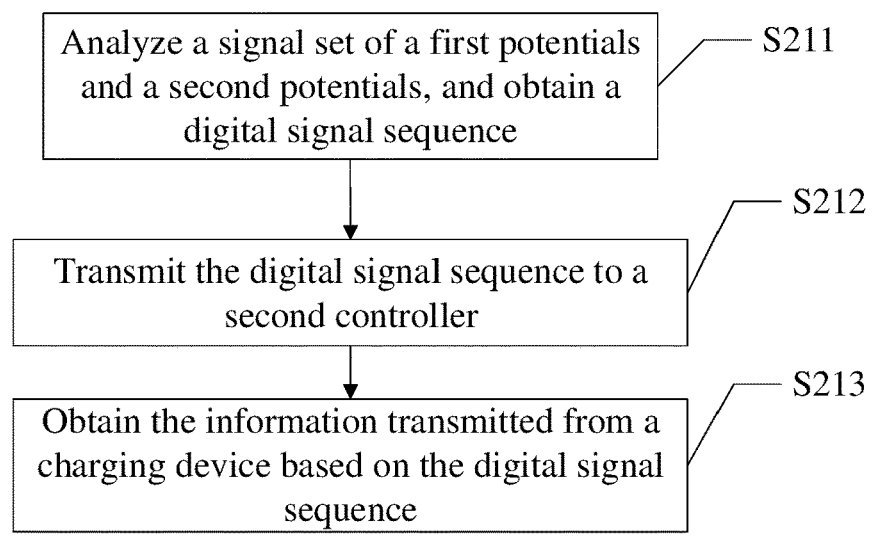
FIG. 21 is a flowchart of a charging and communication method used for a to-be-charged device according to an embodiment of this invention.

FIG. 21 is a flowchart of a charging and communication method of a to-be-charged device according to an embodiment.

At step S211, the signal set of the first potentials and the second potentials is analyzed to obtain a digital signal sequence. In an embodiment, the second potential analysis module 31 analyzes the signal set of the first potentials and the second potentials to obtain the digital signal sequence, where the first potential is not equal to the second potential. In a specific embodiment, the first potential and the second potential come from the charging device through the potential receiving terminal C3.

At step S212, the digital signal sequence is transmitted to a second controller. In an embodiment, after the second potential analysis module 31 analyzes and obtains the digital signal sequence, then transmits the digital signal sequence to the second controller 33.

At step S213, the information from the charging device is obtained based on the digital signal sequence. Specifically, the second controller 33 obtains, based on the digital signal sequence, the information transmitted by the charging device. For details, refer to the description in the foregoing embodiments. Details are not described herein again.

In an optional embodiment, the charging and communication method disclosed in this embodiment further includes: The second controller 33 generates a second control signal sequence according to a second communication information, and transmits the second control signal sequence to a second potential switching module 32, where the second control signal sequence is a binary signal sequence; the second potential switching module 32 sequentially switches an on-off state between the potential receiving terminal C3 and the common ground terminal C4 in response to the second control signal sequence; the potential receiving terminal C3 switches between a first terminal potential and a second terminal potential in response to the on-off state, where the first terminal potential is not equal to the second terminal potential, so that information is transmitted to the charging device. Specifically, for operating principles based on which the elements or modules perform the steps of the method, reference may be made to the description about the hardware circuit in the foregoing embodiments. Details are not described herein again.

It should be noted that, in the charging and communication circuit disclosed in the foregoing embodiments, the elements may be packaged independently, or may be partially or entirely integrated.

This invention further discloses an accessory. The accessory may be an intelligent wearable device such as an earphone, a watch for a kid, or a band, or may be a video/audio accessory such as an MP3 player or an MP4 player, or may be an accessory having a data interaction capability, such as medical consumables for external use, or may be other intelligent accessories of an intelligent terminal that have a data processing capability. It should be particularly noted that, in some application scenarios, such as for a charging case and a wireless Bluetooth earphone, generally, the charging case is a charging device and the wireless Bluetooth earphone is an accessory. When the charging case is charged by another charging apparatus with higher capacity, the charging case may also be used as an accessory, and the other charging apparatus with higher capacity is a charging device.

Figure 22:
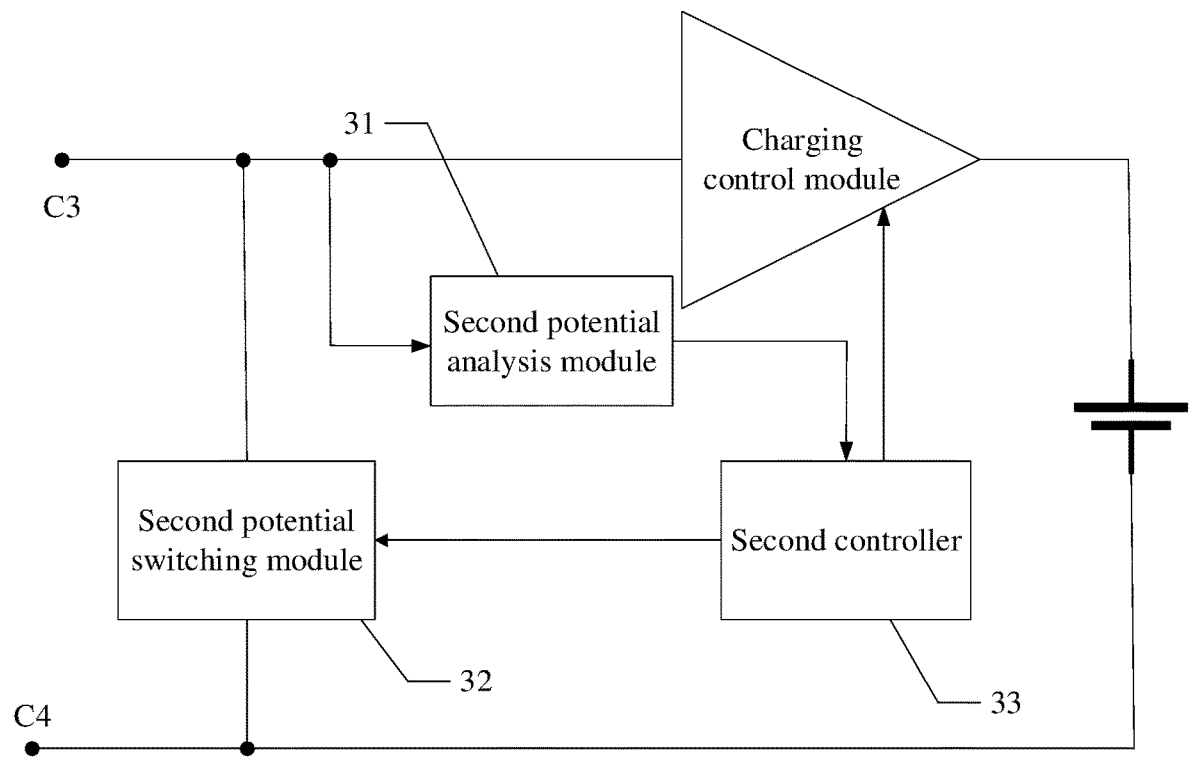
FIG. 22 is a schematic diagram of an example of an accessory according to an embodiment of this invention.

FIG. 22 is a schematic diagram of an accessory according to an embodiment. In a specific embodiment, the accessory includes a charging and communication circuit applicable to a to-be-charged device disclosed in any of the foregoing embodiments. The accessory may further include a second battery, which is detachably or fixedly connected to a potential receiving terminal C3, so s to receive power through the potential receiving terminal C3. In some embodiments, the accessory may further include other components, such as a charging control module and a Bluetooth module.

Figure 23:
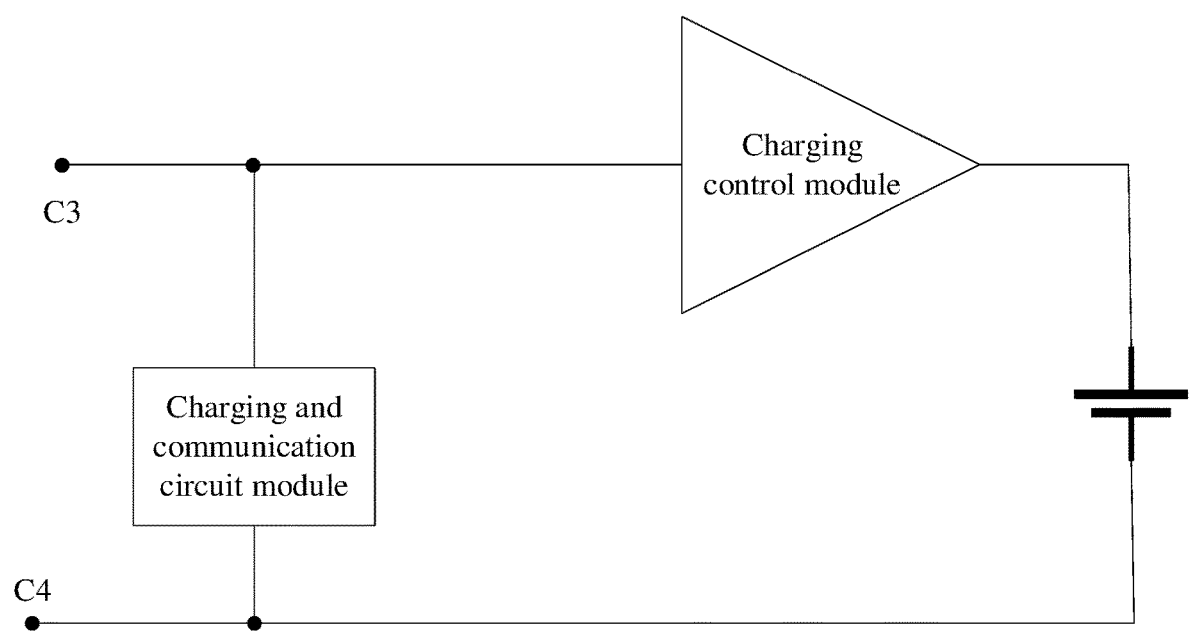
FIG. 23 is a schematic diagram of an example of an accessory according to an embodiment of this invention.

FIG. 23 is a structural principle diagram of an accessory according to an embodiment. The accessory includes a potential receiving terminal C3 and a common ground terminal C4, configured to be connected to a charging device to form a loop with the charging device. Specifically, the potential receiving terminal C3 is configured to receive, after being connected to a charging device, power from the charging device. The power received through the potential receiving terminal C3 is configured as a sequence of a first potential and a second potential in at least a partial period of time. At least one of the first potential and the second potential is a charging potential, so as to implement charging. The first potential is not equal to the second potential. The sequence of the first potential and the second potential is analyzed in the process of receiving power from the charging device, so as to obtain information transmitted by the charging device. It should be particularly noted that, in some application scenarios, such as for a charging case and a wireless Bluetooth earphone, generally, the charging case is a charging device and the wireless Bluetooth earphone is an accessory. When the charging case is charged by another charging apparatus with higher capacity, the charging case may also be used as an accessory, and the other charging apparatus with higher capacity is a charging device.

It should be noted that, in a specific implementation process, the sequence of the first potential and the second potential may be analyzed by a charging and communication circuit module, to obtain the information transmitted by the charging device. In a specific embodiment, the charging and communication circuit module may be implemented by the solution of any of the foregoing embodiments of the charging and communication circuit. In this embodiment, an operating power of the charging and communication circuit module may be provided by the power received by the potential receiving terminal C3, or may be provided by a battery in the accessory. For details, reference may be made to the description in the foregoing embodiments. Details are not described herein again. The charging and communication circuit module may be integrated, or may be packaged independently. When other modules in the accessory also need a controller, the charging and communication circuit module may share the controller with the other modules.

In the accessory disclosed in this embodiment, the potential receiving terminal that receives power is multiplexed, and the received power is configured as the signal set of the first potentials and the second potentials in at least a partial period of time. On one hand, at least one of the first potential and the second potential is the charging potential. Therefore, the charging power can be provided to the to-be-charged device. On the other hand, the first potential is not equal to the second potential. Therefore, in the process of receiving power from the charging device, the sequence of the first potential and the second potential can be analyzed, thus obtaining information transmitted by the charging device. That is, by multiplexing the potential receiving terminal, both reception of the power and analysis of communication information can be implemented. Compared with the prior art in which, without addition of a signal receiving terminal, a single charging mode or a single communication mode needs to be performed in series, the solution in this invention can implement reception of power and communication information in parallel in the same period of time without adding a signal output terminal.

Figure 24:
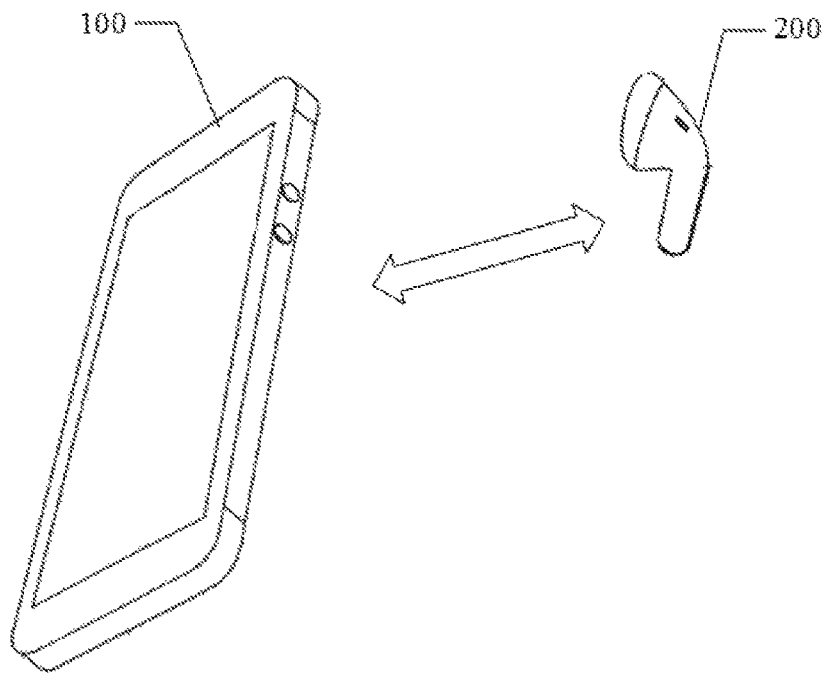
FIG. 24 is a schematic diagram of an intelligent terminal according to an embodiment of this invention.

FIG. 24 is a schematic diagram of an intelligent terminal according to an embodiment. The intelligent terminal includes an intelligent terminal body 100 and an accessory 200 disclosed in any of the foregoing embodiments. The accessory 200 performs data interaction with the intelligent terminal body 100. In a specific embodiment, the intelligent terminal body 100 includes a mobile phone body, a tablet computer body, a notebook computer body, a computer body, an MP3 player body, an MP4 player body, a PDA or other intelligent bodies having a data processing capability. A data interaction mode between the accessory and the intelligent terminal body may be a wireless communication mode such as Bluetooth or WiFi.

This invention further discloses a charging and communication system, including: a charging and communication circuit used for a to-be-charged device disclosed in any of the foregoing embodiments, and a charging and communication circuit used for a charging device disclosed in any of the foregoing embodiments. The potential output terminal C1 and the potential receiving terminal C3 are detachably connected. The to-be-charged device and the charging device can perform information transmission through the potential output terminal C1 and the potential receiving terminal C3.

The charging and communication system includes a potential switching circuit used for a to-be-charged device disclosed in any of the foregoing embodiments, and a charging and communication circuit used for a charging device disclosed in any of the foregoing embodiments. In a specific embodiment, the potential switching circuit and the charging and communication circuit perform information transmission through the potential output terminal C1 and the potential receiving terminal C3.

This invention further discloses a charging and communication system, including: a charging device disclosed in any of the foregoing embodiments and an accessory disclosed in any of the foregoing embodiments.

Figure 25:
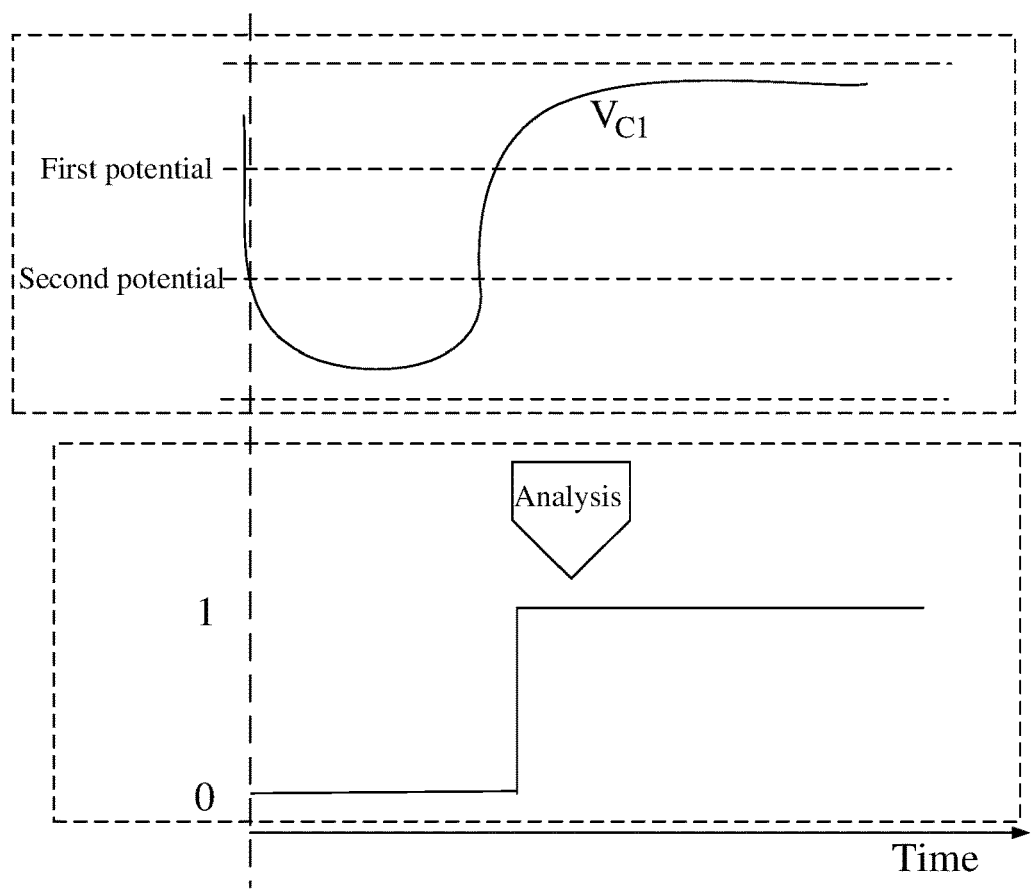
FIG. 25 is a schematic diagram of an example of a potential analysis principle of a charging and communication system according to an embodiment of this invention.

FIG. 25 is a schematic diagram of an example of a potential analysis principle of a charging and communication system according to an embodiment of this invention. Referring to FIG. 25, when a charging device needs to send a first communication information to an accessory, a first potential switching module switches the potential of the potential output terminal C1 between a first potential and a second potential in response to a first control signal outputted by a first controller, as shown by the curve $V_{C1}$ in FIG. 25. After receiving the first potential or the second potential, the accessory analyzes the first potential and the second potential to obtain a digital signal set representing the first communication information.

When the accessory needs to send a second communication information to the charging device, a second potential switching module switches the current from the potential receiving terminal C3 to the common ground terminal C4 in response to a second control signal outputted by a second controller, and the current may be converted into a potential of the potential receiving terminal C3 by using a resistor, thus obtaining the second communication information. Similarly, after receiving the second communication information, the charging device may perform analysis to obtain a digital signal sequence representing the second communication information.

For ease of understanding by a person skilled in the art, a charging case (a charging device) and a wireless earphone (an accessory) are used as an example for description. For example, the wireless earphone is connected to a potential output terminal C1 and a ground terminal C2 of the charging case through its potential receiving terminal C3 and a common ground terminal C4 respectively. A charging power provided by the charging case may be transmitted to the wireless earphone through the connected terminals, so as to charging the wireless earphone. In the charging process, the charging case may encode a to-be-transmitted first communication information (for example, detecting a battery level of the wireless earphone) according to a preset encoding rule. The wireless earphone receives the first communication information (for example, detecting a battery level of the wireless earphone) through the potential receiving terminal C3 in contact. Then, the wireless earphone detects the battery level of the wireless earphone according to the instruction of the first communication information (for example, detecting a battery level of the wireless earphone), and encodes the data representing the battery level according to a preset encoding rule, so as to transmit a second communication information (for example, the battery level of the wireless earphone). The charging case receives the second communication information (for example, the battery of the wireless earphone) through the potential output terminal C1 in contact. Thus a bidirectional communication process for the battery level query is completed. A specific application scenario may also be, for example, controlling pairing of the wireless earphone, right-left alignment of the wireless earphone, or pre-delivery inspection of the wireless earphone by using the charging case. In some scenarios, the wireless earphone may also control the charging case to perform some operations.

It should be noted that, the exemplary description above is merely for helping a person skilled in the art to understand the technical solution, but cannot be construed as a limitation on the technical solution of this invention.

Figure 26:
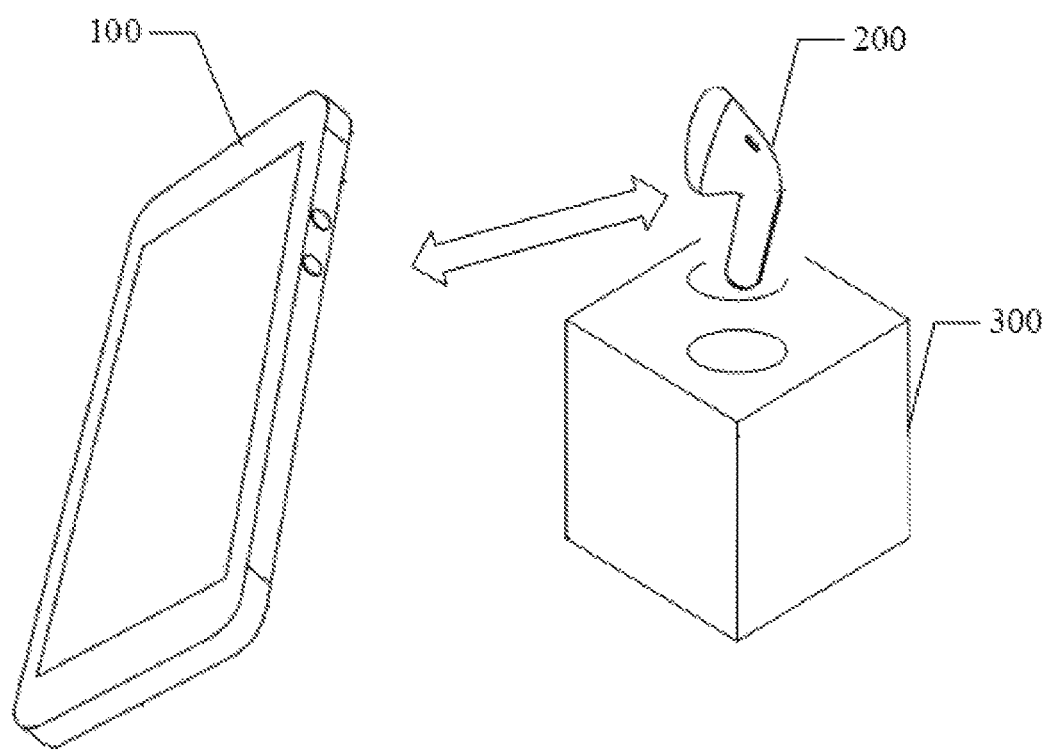
FIG. 26 is a block diagram of charging and communication system according to an embodiment of this invention.

FIG. 26 shows an example of a charging and communication system, including: a charging device 300 disclosed in any of the foregoing embodiments and an intelligent terminal disclosed in any of the foregoing embodiments. The intelligent terminal includes an intelligent terminal body 100 and an accessory 200 disclosed in any of the foregoing embodiments.

For ease of understanding by a person skilled in the art, a charging case (a charging device 300), a mobile terminal (an intelligent terminal body 100), and a wireless earphone (an accessory 200) are used as an example for description, where the mobile terminal and the wireless earphone are compatible, and can implement data interaction mutually, for example, implement data interaction through Bluetooth, WiFi, or the like.

The wireless earphone is connected to a potential output terminal C1 and a ground terminal C2 of the charging case through a potential receiving terminal C3 to a common ground terminal C4 respectively. Charging power provided by the charging case is transmitted to the wireless earphone through the connected terminals, to provide power to the wireless earphone. The wireless earphone may maintain a communication link to the mobile terminal in an ON state as required, and the wireless earphone may be in a low power mode. The mobile terminal sends an instruction of "querying the battery level of the charging case" to the wireless earphone. The wireless earphone performs modulation according to the instruction to generate a second communication information, and sends the second communication information to the charging case. The charging case queries the battery level according to the second communication information, then modulates battery level data of the charging case into a first communication information and sends the first communication information to the wireless earphone. The wireless earphone analyzes the first communication information to obtain the battery level data of the charging case, and sends the battery level data to the mobile terminal. Definitely, the wireless earphone may also directly forward the first communication information to the mobile terminal, and then the mobile terminal analyzes the first communication information to obtain the battery level data of the charging case.

Obviously, the embodiments above are merely examples for clear description, and are not intended to limit the implementations. For a person of ordinary skill in the art, changes or modifications of other different forms may also be made based on the description above. Herein, it is unnecessary and impossible to enumerate all the implementation manners. Obvious derived changes or modifications still fall within the protection scope of the present invention.

It can be appreciated by a person skilled in the art that, the foregoing preferred solutions may be combined and superposed freely on the premise of not causing conflict.

It should be appreciated that, the foregoing implementations are merely exemplary rather than limitative. Various obvious or equivalent modifications or replacements made on the details above by a person skilled in the art without departing from the basic principle of the present invention are all included in the scope of the claims of the present invention.

What is claimed is:

1. A charging and communication system, comprising:
   a charging and communication circuit of a charging device, comprising:
      a potential output terminal (C1), configured to supply power to a to-be-charged device after being connected to a power terminal of the to-be-charged device;
      a first potential switching module (1) connected to the potential output terminal (C1); and
      a first controller (3) connected to the first potential switching module (1), the first controller (3) being configured to generate a first control signal;
      wherein the first potential switching module (1) switches between a first potential and a second potential in response to the first control signal; at least one of the first potential and the second potential is a charging potential, so as to supply power to the to-be-charged device; the first potential is not equal to the second potential, so that information is transmitted to the to-be-charged device in the process of supplying power to the to-be-charged device; and
   a charging and communication circuit of a to-be-charged device, comprising a potential receiving terminal (C3), the potential output terminal (C1) and the potential receiving terminal (C3) being detachably connected to transmit information;
   wherein the first potential switching module (1) comprises:
      a voltage conversion unit (11), configured to convert a potential of a charging power source into the first potential.

2. The charging and communication system according to claim 1, wherein the first potential switching module (1) comprises:
   a first transfer switch (S1), having an output connected to the potential output terminal (C1), having a first input connected to the first potential, having a second input connected to the second potential; wherein the first transfer switch (S1) switches between the first potential and the second potential when being triggered by the first control signal, such that the potential output terminal (C1) is switched between the first potential and the second potential.

3. The charging and communication system according to claim 1, wherein the voltage conversion unit is a voltage step-up unit.

4. The charging and communication system according to claim 1, wherein the second potential is the potential of the charging power source.

5. The charging and communication system according to claim 1, wherein the voltage conversion unit is a voltage step-down unit, configured to reduce the potential of the charging power source to the first potential and the second potential.

6. The charging and communication system according to claim 1, wherein both the first potential and the second potential satisfy the potential required for the to-be-charged device in a communication process.

7. The charging and communication circuit according to claim 1, further comprising:
   a first potential analysis module (2) connected to the potential output terminal (C1), wherein the first potential analysis module is configured to analyze an electrical signal received by the potential output terminal (C1) from the to-be-charged device, to obtain a signal set of first terminal potentials and second terminal potentials, and the first terminal potential is not equal to the second terminal potential.

8. The charging and communication system according to claim 7, wherein the first potential analysis module (2) comprises:
   a first comparator, having an input node connected to the potential output terminal (C1), the first comparator being configured to compare electric signals received by the input node thereof with a reference potential, to obtain a comparison result, and the comparison result being the signal set of the first terminal potentials and the second terminal potentials.

9. The charging and communication system according to claim 8, wherein the electrical signal received by the potential output terminal (C1) from the to-be-charged device is a current signal, and the first potential analysis module further comprises:
   an I/V conversion circuit connected to the potential output terminal (C1), the I/V conversion circuit being configured to convert the current signal received by the potential output terminal (C1) into a voltage signal and send the voltage signal to the input node of the first comparator.

10. The charging and communication system according to claim 9, wherein the I/V conversion circuit comprises an I/V conversion resistor, one end of the I/V conversion resistor is connected to the potential output terminal (C1) and the input node of the first comparator, and the other end of the I/V conversion resistor is connected to a reference node of the first comparator.

11. The charging and communication system according to claim 7, wherein
   the first controller is further connected to the first potential analysis module, and the first controller obtains a second communication information according to the signal set of the first terminal potentials and the second terminal potentials.

12. The charging and communication system according to claim 1, further comprising:
   a trigger module connected to the first controller, wherein the first controller generates the first control signal when being triggered by the trigger module.

13. A charging and communication system, comprising:
   a charging and communication circuit of a to-be-charged device, comprising
   a potential receiving terminal (C3), configured to receive power from a charging device after being connected to the charging device, the received power being configured as a signal set of first potentials and second potentials in at least a partial time period, and at least one of the first potential and the second potential being a charging potential, so as to supply power to a to-be-charged device;

a second potential analysis module (31) connected to the potential receiving terminal (C3), the second potential analysis module (31) being configured to analyze the signal set of the first potentials and the second potentials to obtain a digital signal sequence, and the first potential being not equal to the second potential, so that information transmitted by a charging device is obtained; and a charging and communication circuit of the charging device, comprising a potential output terminal (C1), the potential output terminal (C1) and the potential receiving terminal (C3) being detachably connected to transmit information.

14. The charging and communication system according to claim 13, wherein the second potential analysis module (31) comprises:

a second comparator, having a first input connected to the potential receiving terminal (C3), the second comparator comparing the signal set of the first potentials and the second potentials received by the first input thereof with a reference voltage to obtain the digital signal sequence.

15. The charging and communication system according to claim 14, wherein the second potential analysis module (31) further comprises:

a reference voltage circuit connected to a reference input of the second comparator, the reference voltage circuit being configured to provide the reference voltage to the second comparator.

16. The charging and communication system according to claim 13, wherein both the first potential and the second potential satisfy the potential required for the to-be-charged device working in a communication process.

17. The charging and communication system according to claim 13, further comprising:

a second controller (33) connected to an output of the second potential analysis module (31), the second controller (33) being configured to obtain, according to the digital signal sequence, the information transmitted by the charging device.

18. The charging and communication system according to claim 17, further comprising:

a common ground terminal (C4), configured to, after being connected to the charging device, connect the charging device and the to-be-charged device to a common ground.

19. The charging and communication system according to claim 18, further comprising:

a second potential switching module (32) connected between the potential receiving terminal (C3) and the common ground terminal (C4), the second potential switching module (32) being further connected to the second controller (33);

wherein the second controller (33) is configured to generate a second control signal; the second potential switching module (32) switches a potential of the potential receiving terminal (C3) between a first terminal potential and a second terminal potential in response to the second control signal, and the first terminal potential is not equal to the second terminal potential, so that information is transmitted to the charging device.

20. The charging and communication system according to claim 19, wherein the second potential switching module (32) comprises:

a variable resistor connected between the potential receiving terminal (C3) and the common ground terminal (C4), the resistance value of the variable resistor being switched between a first resistance value and a second resistance value according to the received second control signal, and the first resistance value being not equal to the second resistance value.

21. The charging and communication system according to claim 20, wherein the second potential switching module (32) comprises:

a switch circuit connected between the potential receiving terminal (C3) and the common ground terminal (C4), the switch circuit switching an on-off state between ON and OFF according to the received second control signal.

22. The charging and communication system according to claim 21, wherein the switch circuit comprises:

a resistor; and a switch device sequentially connected in series with the resistor between the potential receiving terminal (C3) and the common ground terminal (C4), the switch device switching an ON/OFF state according to the second control signal.

* * * * *